United States Patent
Kim et al.

(10) Patent No.: US 8,432,392 B2
(45) Date of Patent: Apr. 30, 2013

(54) DISPLAY SYSTEM WITH IMAGE CONVERSION MECHANISM AND METHOD OF OPERATION THEREOF

(75) Inventors: Yoon Kyung Kim, Costa Mesa, CA (US); Zhi Zhou, Irvine, CA (US); Yeong-Taeg Kim, Irvine, CA (US)

(73) Assignee: Samsung Electronics Co., Ltd., Suwon, Gyeonggi-Do (KR)

( * ) Notice: Subject to any disclaimer, the term of this patent is extended or adjusted under 35 U.S.C. 154(b) by 0 days.

(21) Appl. No.: 13/160,409

(22) Filed: Jun. 14, 2011

(65) Prior Publication Data

US 2012/0056874 A1   Mar. 8, 2012

Related U.S. Application Data

(60) Provisional application No. 61/379,688, filed on Sep. 2, 2010.

(51) Int. Cl.
*G06T 15/00* (2011.01)

(52) U.S. Cl.
USPC ............. 345/419; 345/582; 345/591; 356/39; 382/285; 715/862; 715/863

(58) Field of Classification Search .............. 345/419, 345/582, 591; 715/862, 863; 382/285; 356/39
See application file for complete search history.

(56) References Cited

U.S. PATENT DOCUMENTS

| | | | |
|---|---|---|---|
| 6,429,875 B1 * | 8/2002 | Pettigrew et al. | 345/591 |
| 6,477,267 B1 | 11/2002 | Richards | |
| 6,867,787 B1 * | 3/2005 | Shimizu et al. | 345/629 |
| 7,573,475 B2 | 8/2009 | Sullivan et al. | |
| 7,573,489 B2 | 8/2009 | Davidson et al. | |
| 7,853,085 B2 * | 12/2010 | Miller | 382/215 |
| 2003/0184730 A1 * | 10/2003 | Price | 356/39 |
| 2005/0166163 A1 * | 7/2005 | Chang et al. | 715/863 |
| 2008/0192067 A1 | 8/2008 | Barenbrug et al. | |
| 2008/0225045 A1 | 9/2008 | Birtwistle et al. | |
| 2008/0316359 A1 | 12/2008 | Kim et al. | |
| 2008/0317123 A1 | 12/2008 | Kim et al. | |
| 2010/0142924 A1 | 6/2010 | Yamashita et al. | |

* cited by examiner

*Primary Examiner* — Phu K Nguyen

(57) ABSTRACT

A method of operation of a display system includes: receiving a current input image with current input pixels; identifying an input object, having input object pixels, based on differences in characteristics of the current input pixels; calculating an object pixel depth for the input object pixels from an image depth map of the current input image based on a weighted average of depth candidates; and generating a processed image, having a perceived depth, from the current input image with the image depth map and the object pixel depth for displaying on a device.

20 Claims, 12 Drawing Sheets

DISPLAY SYSTEM WITH IMAGE CONVERSION MECHANISM AND METHOD OF OPERATION THEREOF

CROSS-REFERENCE TO RELATED APPLICATION(S)

This application claims the benefit of U.S. Provisional Patent Application Ser. No. 61/379,688 filed Sep. 2, 2010, and the subject matter thereof is incorporated herein by reference thereto.

TECHNICAL FIELD

The present invention relates generally to a display system, and more particularly to a system for image conversion.

BACKGROUND ART

Modern consumer and industrial electronics, especially devices such as graphical display systems, televisions, projectors, cellular phones, portable digital assistants, and combination devices, are providing increasing levels of functionality to support modern life including three-dimensional display services. Research and development in the existing technologies can take a myriad of different directions.

As users become more empowered with the growth of three-dimensional display devices, new and old paradigms begin to take advantage of this new device space. There are many technological solutions to take advantage of this new display device opportunity. One existing approach is to display three-dimensional images on consumer, industrial, and mobile electronics such as video projectors, televisions, monitors, gaming systems, or a personal digital assistant (PDA).

Three-dimensional display based services allow users to create, transfer, store, and/or consume information in order for users to create, transfer, store, and consume in the "real world". One such use of three-dimensional display based services is to efficiently present three-dimensional images on a display.

Three-dimensional display systems have been incorporated in projectors, televisions, notebooks, handheld devices, and other portable products. Today, these systems aid users by displaying available relevant information, such as diagrams, maps, or videos. The display of three-dimensional images provides invaluable relevant information.

However, displaying information in three-dimensional form has become a paramount concern for the consumer. Displaying a three-dimensional image that does not correlate with the real world decreases the benefit of using the three-dimensional display systems. For example, objects over an image having a disparity in depth can cause discomfort to users.

Thus, a need still remains for a three-dimensional display system with image conversion mechanism to display three-dimensional images. In view of the ever-increasing commercial competitive pressures, along with growing consumer expectations and the diminishing opportunities for meaningful product differentiation in the marketplace, it is increasingly critical that answers be found to these problems. Additionally, the need to reduce costs, improve efficiencies and performance, and meet competitive pressures adds an even greater urgency to the critical necessity for finding answers to these problems.

Solutions to these problems have been long sought but prior developments have not taught or suggested any solutions and, thus, solutions to these problems have long eluded those skilled in the art.

DISCLOSURE OF THE INVENTION

The present invention provides a method of operation of a display system including: receiving a current input image with current input pixels; identifying an input object, having input object pixels, based on differences in characteristics of the current input pixels; calculating an object pixel depth for the input object pixels from an image depth map of the current input image based on a weighted average of depth candidates; and generating a processed image, having a perceived depth, from the current input image with the image depth map and the object pixel depth for displaying on a device.

The present invention provides a display system, including: a communication unit for receiving a current input image having current input pixels; an object detection module, coupled to the communication unit, for identifying an input object, having input object pixels, based on differences in characteristics of the current input pixels; an object depth module; coupled to the object detection module, for calculating an object pixel depth for the input object pixels from an image depth map of the current input image based on a weighted average of depth candidates; and an image conversion module; coupled to the object depth module, for generating a processed image, having a perceived depth; from the current input image with the image depth map and the object pixel depth; for displaying on a device.

Certain embodiments of the invention have other steps or elements in addition to or in place of those mentioned above. The steps or elements will become apparent to those skilled in the art from a reading of the following detailed description when taken with reference to the accompanying drawings.

BEST MODE FOR CARRYING OUT THE INVENTION

Figure 1:
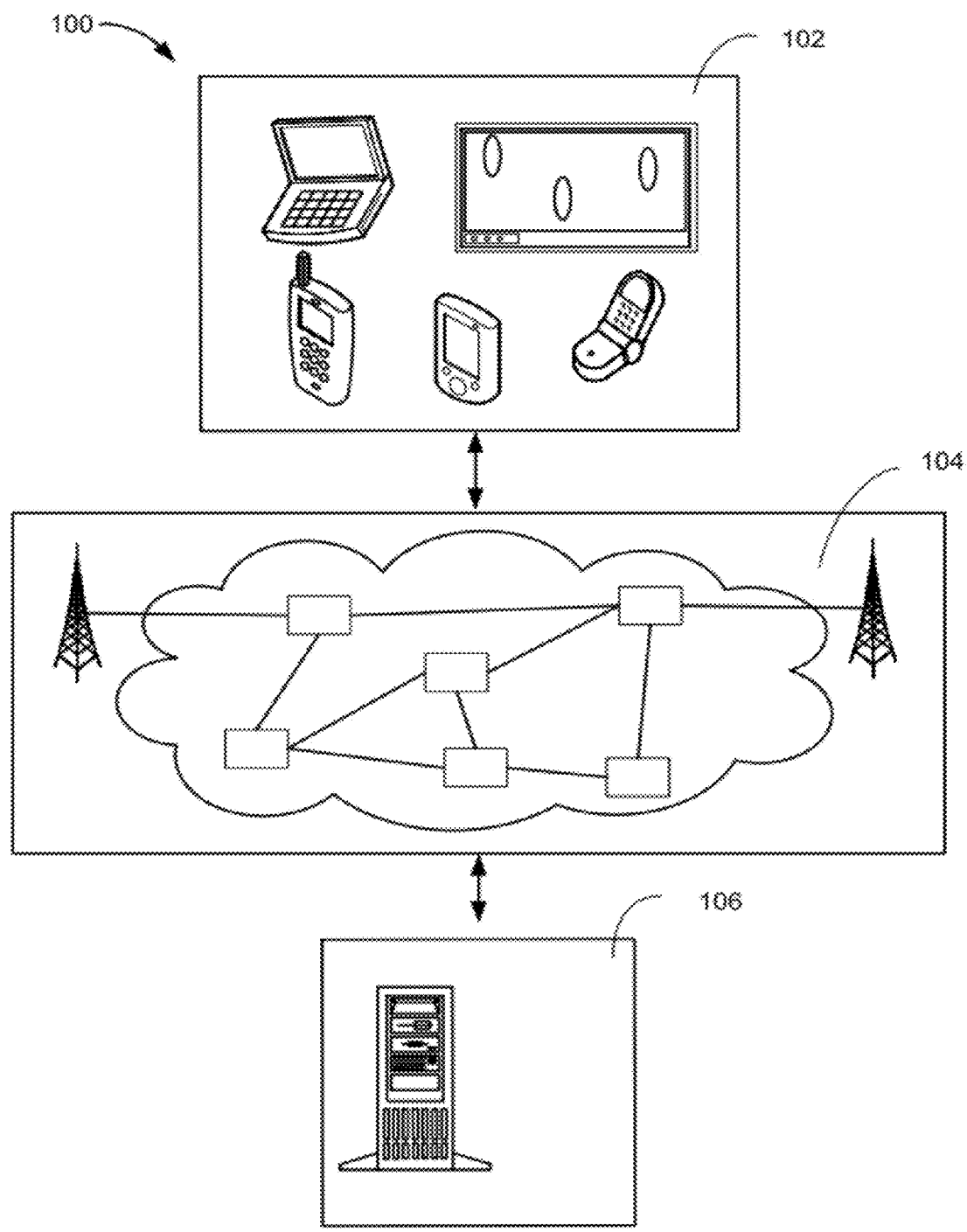
FIG. 1 is a display system with image conversion mechanism in an embodiment of the present invention.

The following embodiments are described in sufficient detail to enable those skilled in the art to make and use the invention. It is to be understood that other embodiments would be evident based on the present disclosure, and that system, process, or mechanical changes may be made without departing from the scope of the present invention.

In the following description, numerous specific details are given to provide a thorough understanding of the invention. However, it will be apparent that the invention may be practiced without these specific details. In order to avoid obscuring the present invention, some well-known circuits, system configurations, and process steps are not disclosed in detail.

The drawings showing embodiments of the system are semi-diagrammatic, and not to scale and, particularly, some of the dimensions are for the clarity of presentation and are shown exaggerated in the drawing FIGs. Similarly, although the views in the drawings for ease of description generally show similar orientations, this depiction in the FIGs. is arbitrary for the most part. Generally, the invention can be operated in any orientation. The embodiments have been numbered first embodiment, second embodiment, etc. as a matter of descriptive convenience and are not intended to have any other significance or provide limitations for the present invention.

One skilled in the art would appreciate that the format with which image information is expressed is not critical to some embodiments of the invention. For example, in some embodiments, image information is presented in the format of (X, Y), where X and Y are two coordinates that define the location of a pixel in an image.

In an alternative embodiment, three-dimensional image information is presented by a format of (X, Y, Z) with related information for color of the pixel. In a further embodiment of the present invention, the three-dimensional image information also includes an intensity or brightness element.

The term "image" referred to herein can include a two-dimensional image, three-dimensional image, video frame, a computer file representation, an image from a camera, a video frame, or a combination thereof. For example, the image can be a machine readable digital file, a physical photograph, a digital photograph, a motion picture frame, a video frame, an x-ray image, a scanned image, or a combination thereof. Also for example, the hardware can be circuitry, processor, computer, integrated circuit, integrated circuit cores, a pressure sensor, an inertial sensor, a micro-electromechanical system (MEMS), passive devices, or a combination thereof.

The term "module" referred to herein can include software, hardware, or a combination thereof. For example, the software can be machine code, firmware, embedded code, and application software. Also for example, the hardware can be circuitry, processor, computer, integrated circuit, integrated circuit cores, a pressure sensor, an inertial sensor, a micro-electromechanical system (MEMS), passive devices, or a combination thereof.

Referring now to FIG. 1, therein is shown a display system 100 with image conversion mechanism in an embodiment of the present invention. The display system 100 includes a first device 102, such as a client or a server, connected to a second device 106, such as a client or server. The first device 102 can communicate with the second device 106 with a communication path 104, such as a wireless or wired network.

For example, the first device 102 can be of any of a variety of display devices, such as a cellular phone, personal digital assistant, a notebook computer, a liquid crystal display (LCD) system, or other multi-functional display or entertainment device. The first device 102 can couple, either directly or indirectly, to the communication path 104 to communicate with the second device 106 or can be a stand-alone device.

For illustrative purposes, the display system 100 is described with the first device 102 as a display device, although it is understood that the first device 102 can be different types of devices. For example, the first device 102 can also be a device for presenting images or a multi-media presentation. A multi-media presentation can be a presentation including sound, a sequence of streaming images or a video feed, or a combination thereof. As an example, the first device 102 can be a high definition television, a three dimensional television, a computer monitor, a personal digital assistant, a cellular phone, or a multi-media set.

The second device 106 can be any of a variety of centralized or decentralized computing devices, or video transmission devices. For example, the second device 106 can be a multimedia computer, a laptop computer, a desktop computer, a video game console, grid-computing resources, a virtualized computer resource, cloud computing resource, routers, switches, peer-to-peer distributed computing devices, a media playback device, a Digital Video Disk (DVD) player, a three-dimension enabled DVD player, a recording device, such as a camera or video camera, or a combination thereof. In another example, the second device 106 can be a signal receiver for receiving broadcast or live stream signals, such as a television receiver, a cable box, a satellite dish receiver, or a web enabled device, such as a TiVo™ or Slingbox™.

The second device 106 can be centralized in a single room, distributed across different rooms, distributed across different geographical locations, embedded within a telecommunications network. The second device 106 can have a means for coupling with the communication path 104 to communicate with the first device 102.

For illustrative purposes, the display system 100 is described with the second device 106 as a computing device, although it is understood that the second device 106 can be different types of devices. Also for illustrative purposes, the display system 100 is shown with the second device 106 and the first device 102 as end points of the communication path 104, although it is understood that the display system 100 can have a different partition between the first device 102, the second device 106, and the communication path 104. For example, the first device 102, the second device 106, or a combination thereof can also function as part of the communication path 104.

The communication path 104 can be a variety of networks. For example, the communication path 104 can include wireless communication, wired communication, optical, ultrasonic, or the combination thereof. Satellite communication, cellular communication, Bluetooth, Infrared Data Association standard (IrDA), wireless fidelity (WiFi), and worldwide interoperability for microwave access (WiMAX) are examples of wireless communication that can be included in the communication path 104. Ethernet, digital subscriber line (DSL), fiber to the home (FTTH), and plain old telephone service (POTS) are examples of wired communication that can be included in the communication path 104.

Further, the communication path 104 can traverse a number of network topologies and distances. For example, the communication path 104 can include direct connection, personal area network (PAN), local area network (LAN), metropolitan area network (MAN), wide area network (WAN), or a combination thereof.

Figure 2:
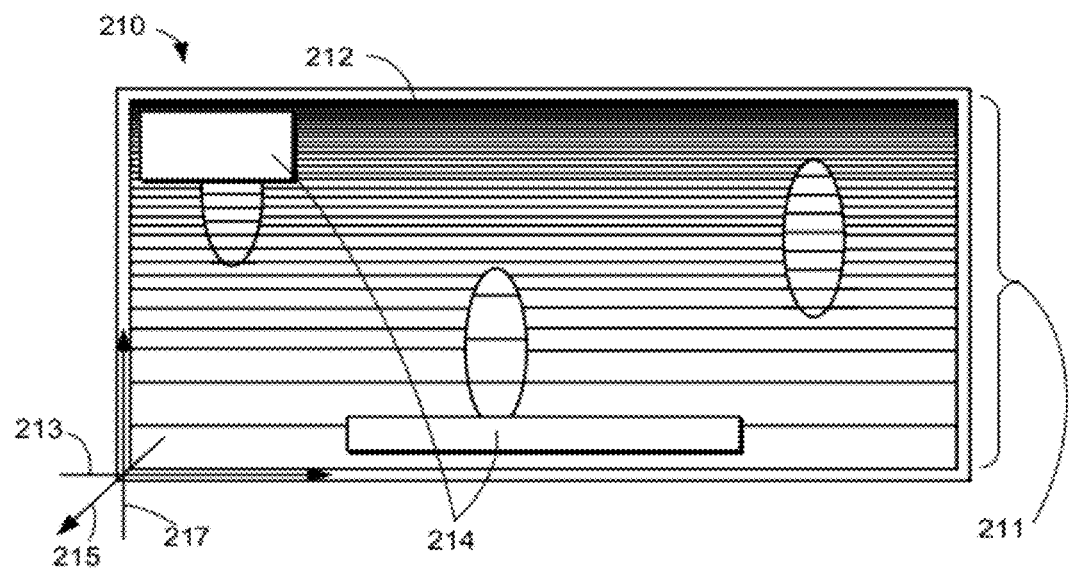
FIG. 2 is an example of a display interface of the first device of FIG. 1.

Referring now to FIG. 2, therein is shown an example of a display interface 210 of the first device 102 of FIG. 1. The display interface 210 is a physical device for presenting the image or the multi-media presentations. For example, the display interface can be a screen, including a liquid crystal display (LCD) panel, a plasma screen, or a projection screen.

The display interface 210 can display a processed image 212. The processed image 212 is defined as an image, having a number of pixels, which has been processed to have a perceived depth 211 when presented on the display interface 210.

The perceived depth 211 is defined as when the display interface 210 is viewed from a distance, an object will appear closer or further away relative to other objects or a background in an image. For example, in a three dimensional Cartesian coordinate system with an origin located at the bottom left corner of an image, the x-axis 213 is defined as a reference for the measurement of width, the y-axis 215 is defined as a reference for the measurement of depth, and the z-axis 217 is defined as a reference for the measurement of height. Objects that have a large value for the y-coordinate can have a greater value of the perceived depth 211 than an object with a smaller value for the y-coordinate. Objects with a greater value of the perceived depth 211 will appear closer than objects with a lesser value of the perceived depth 211.

As a further example, a user can observe or notice the perceive depth 211 by noticing that objects in the processed image 212 appear outside or in front of the plane of the display interface 210. Similarly, the user can perceive depth by noticing that the objects in the processed image 212 appear within and deeper behind the plane of the display interface 210. For example, the processed image 212 can blur the pixels as a way of expressing distance. The intensity of the brightness and color is also reduced to provide the perceived depth 211.

In yet another example, the perceived depth 211 can be represented by the line spacing. The portions of the processed image 212 having closely spaced lines can represent a lower value of the perceived depth 211 while objects having wide spacing of lines can represent a higher value of the perceived depth 211. As a specific example, the top portion of the processed image 212, which has closely spaced lines, can have a lower value of the perceived depth 211 and appear further away than the bottom portion of the processed image 212, which has widely spaced lines, corresponding to a higher value of the perceived depth 211.

The processed image 212 can include a processed object 214. The processed object 214 is defined as an object having the perceived depth 211 that is uniform and that remains in a relatively fixed position. An object having the perceived depth 211 that is uniform is defined as all parts of the object having the same value of the perceived depth 211. An object having the relatively fixed position is defined as the object having little or no movement along the x-axis 213 or the z-axis 217 from one image to the next in a stream or sequence of images.

The processed object 214 can have a greater value of the perceived depth 211 relative to the portions of the processed image 212 adjacent to the processed object 214. For example, this means that the processed object 214 can appear to float or hover above the processed image 212.

Example of the processed object 214 can include a string or group of text for subtitles, a scoreboard in a sporting event, or an animated or non-animated logo, such as a logo representing a television station, or a scrolling banners or text fields, such as the scrolling text for advertisements or news updates that can appear in a relatively fixed location in the processed image 212. As a further example, in order to provide the perceived depth 211 to the processed object 214, a blurring and softening of the pixels within the area of the processed object 214 can provide texture and imply a separation between any of the processed object 214 in the processed image 212.

Figure 3:
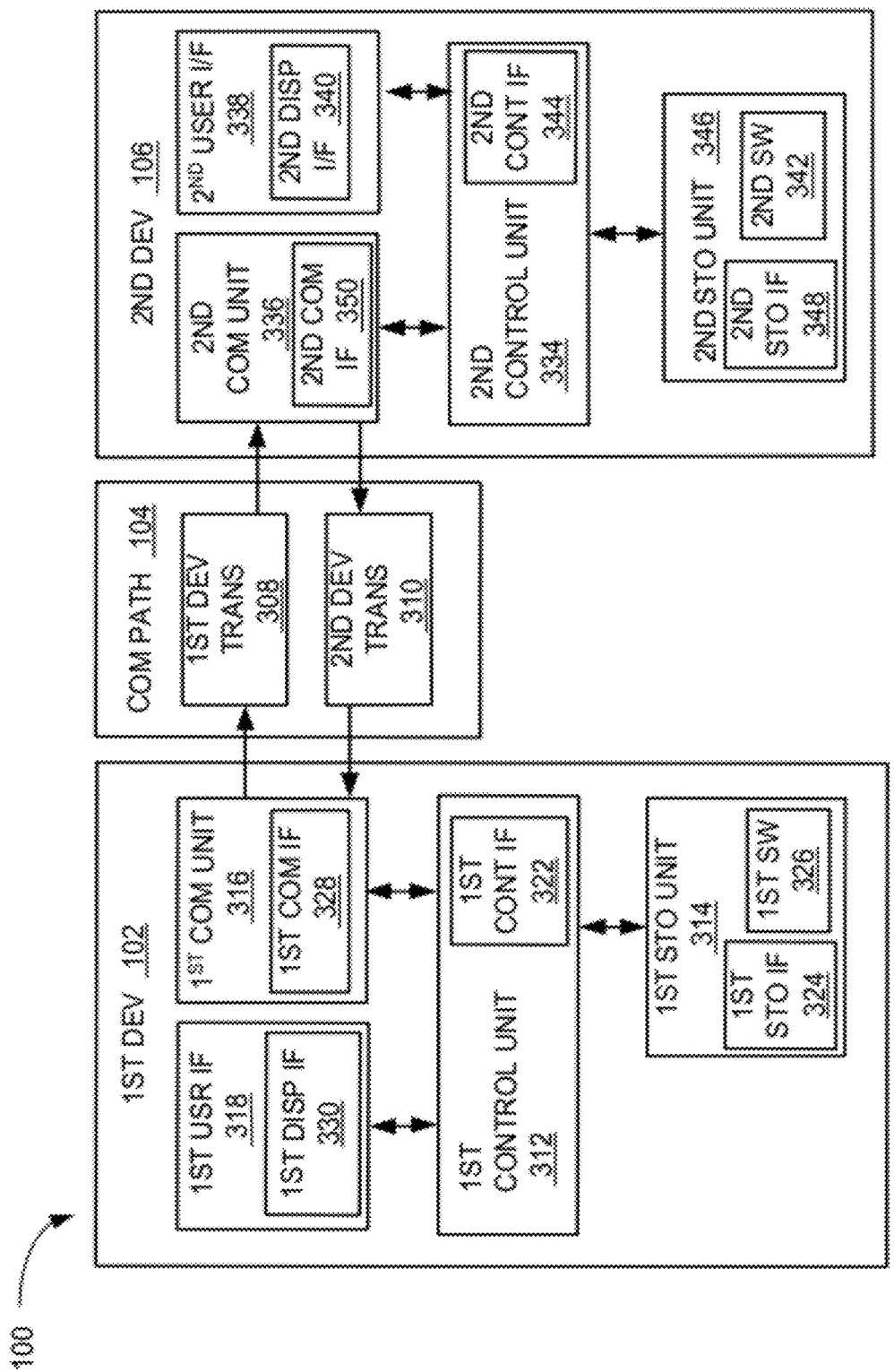
FIG. 3 is an exemplary block diagram of the display system.

Referring now to FIG. 3, therein is shown an exemplary block diagram of the display system 100. The display system 100 can include the first device 102, the communication path 104, and the second device 106. The first device 102 can send information in a first device transmission 308 over the communication path 104 to the second device 106. The second device 106 can send information in a second device transmission 310 over the communication path 104 to the first device 102.

For illustrative purposes, the display system 100 is shown with the first device 102 as a client device, although it is understood that the display system 100 can have the first device 102 as a different type of device. For example, the first device 102 can be a server having a display interface.

Also for illustrative purposes, the display system 100 is shown with the second device 106 as a server, although it is understood that the display system 100 can have the second device 106 as a different type of device. For example, the second device 106 can be a client device.

For brevity of description in this embodiment of the present invention, the first device 102 will be described as a client device and the second device 106 will be described as a server device. The present invention is not limited to this selection for the type of devices. The selection is an example of the present invention.

The first device 102 can include a first control unit 312, a first storage unit 314, a first communication unit 316, and a first user interface 318. The first control unit 312 can include a first control interface 322. The first control unit 312 can execute a first software 326 to provide the intelligence of the display system 100.

The first control unit 312 can be implemented in a number of different manners. For example, the first control unit 312 can be a processor, an application specific integrated circuit (ASIC) an embedded processor, a microprocessor, a hardware control logic, a hardware finite state machine (FSM), a digital signal processor (DSP), or a combination thereof. The first control interface 322 can be used for communication between the first control unit 312 and other functional units in the first device 102. The first control interface 322 can also be used for communication that is external to the first device 102.

The first control interface 322 can receive information from the other functional units or from external sources, or can transmit information to the other functional units or to external destinations. The external sources and the external destinations refer to sources and destinations external to the first device 102.

The first control interface 322 can be implemented in different ways and can include different implementations depending on which functional units or external units are being interfaced with the first control interface 322. For example, the first control interface 322 can be implemented with a pressure sensor, an inertial sensor, a microelectromechanical system (MEMS), optical circuitry, waveguides, wireless circuitry, wireline circuitry, or a combination thereof.

The first storage unit 314 can store the first software 326. The first storage unit 314 can also store the relevant information, such as data representing incoming images, data representing previously presented image, sound files, or a combination thereof.

The first storage unit 314 can be a volatile memory, a nonvolatile memory, an internal memory, an external memory, or a combination thereof. For example, the first storage unit 314 can be a nonvolatile storage such as nonvolatile random access memory (NVRAM), Flash memory, disk storage, or a volatile storage such as static random access memory (SRAM).

The first storage unit 314 can include a first storage interface 324. The first storage interface 324 can be used for communication between and other functional units in the first device 102. The first storage interface 324 can also be used for communication that is external to the first device 102.

The first storage interface 324 can receive information from the other functional units or from external sources, or can transmit information to the other functional units or to external destinations. The external sources and the external destinations refer to sources and destinations external to the first device 102.

The first storage interface 324 can include different implementations depending on which functional units or external units are being interfaced with the first storage unit 314. The first storage interface 324 can be implemented with technologies and techniques similar to the implementation of the first control interface 322.

The first communication unit 316 can enable external communication to and from the first device 102. For example, the first communication unit 316 can permit the first device 102 to communicate with the second device 106 of FIG. 1, an attachment, such as a peripheral device or a computer desktop, and the communication path 104.

The first communication unit 316 can also function as a communication hub allowing the first device 102 to function as part of the communication path 104 and not limited to be an end point or terminal unit to the communication path 104. The first communication unit 316 can include active and passive components, such as microelectronics or an antenna, for interaction with the communication path 104.

The first communication unit 316 can include a first communication interface 328. The first communication interface 328 can be used for communication between the first communication unit 316 and other functional units in the first device 102. The first communication interface 328 can receive information from the other functional units or can transmit information to the other functional units.

The first communication interface 328 can include different implementations depending on which functional units are being interfaced with the first communication unit 316. The first communication interface 328 can be implemented with technologies and techniques similar to the implementation of the first control interface 322.

The first user interface 318 allows a user (not shown) to interface and interact with the first device 102. The first user interface 318 can include an input device and an output device. Examples of the input device of the first user interface 318 can include a keypad, a touchpad, soft-keys, a keyboard, a microphone, an infrared sensor for receiving remote signals, or any combination thereof to provide data and communication inputs.

The first user interface 318 can include a first display interface 330. The first display interface 330 can include a display, a projector, a video screen, a speaker, or any combination thereof.

The first control unit 312 can operate the first user interface 318 to display information generated by the display system 100. The first control unit 312 can also execute the first software 326 for the other functions of the display system 100. The first control unit 312 can further execute the first software 326 for interaction with the communication path 104 via the first communication unit 316.

The second device 106 can be optimized for implementing the present invention in a multiple device embodiment with the first device 102. The second device 106 can provide the additional or higher performance processing power compared to the first device 102. The second device 106 can include a second control unit 334, a second communication unit 336, and a second user interface 338.

The second user interface 338 allows a user (not shown) to interface and interact with the second device 106. The second user interface 338 can include an input device and an output device. Examples of the input device of the second user interface 338 can include a keypad, a touchpad, soft-keys, a keyboard, a microphone, or any combination thereof to provide data and communication inputs. Examples of the output device of the second user interface 338 can include a second display interface 340. The second display interface 340 can include a display, a projector, a video screen, a speaker, or any combination thereof.

The second control unit 334 can execute a second software 342 to provide the intelligence of the second device 106 of the display system 100. The second software 342 can operate in conjunction with the first software 326. The second control unit 334 can provide additional performance compared to the first control unit 312.

The second control unit 334 can operate the second user interface 338 to display information. The second control unit 334 can also execute the second software 342 for the other functions of the display system 100, including operating the second communication unit 336 to communicate with the first device 102 over the communication path 104.

The second control unit 334 can be implemented in a number of different manners. For example, the second control unit 334 can be a processor, an embedded processor, a microprocessor, a hardware control logic, a hardware finite state machine (FSM), a digital signal processor (DSP), or a combination thereof.

The second control unit 334 can include a second controller interface 344. The second controller interface 344 can be used for communication between the second control unit 334 and other functional units in the second device 106. The second controller interface 344 can also be used for communication that is external to the second device 106.

The second controller interface 344 can receive information from the other functional units or from external sources, or can transmit information to the other functional units or to external destinations. The external sources and the external destinations refer to sources and destinations external to the second device 106.

The second controller interface 344 can be implemented in different ways and can include different implementations depending on which functional units or external units are being interfaced with the second controller interface 344. For example, the second controller interface 344 can be implemented with a pressure sensor, an inertial sensor, a microelectromechanical system (MEMS), optical circuitry, waveguides, wireless circuitry, wireline circuitry, or a combination thereof.

A second storage unit 346 can store the second software 342. The second storage unit 346 can also store the such as data representing incoming images, data representing previously presented image, sound files, or a combination thereof. The second storage unit 346 can be sized to provide the additional storage capacity to supplement the first storage unit 314.

For illustrative purposes, the second storage unit 346 is shown as a single element, although it is understood that the second storage unit 346 can be a distribution of storage elements. Also for illustrative purposes, the display system 100 is shown with the second storage unit 346 as a single hierarchy storage system, although it is understood that the display system 100 can have the second storage unit 346 in a different configuration. For example, the second storage unit 346 can be formed with different storage technologies forming a memory hierarchal system including different levels of caching, main memory, rotating media, or off-line storage.

The second storage unit 346 can be a volatile memory, a nonvolatile memory, an internal memory, an external memory, or a combination thereof. For example, the second storage unit 346 can be a nonvolatile storage such as non-volatile random access memory (NVRAM), Flash memory, disk storage, or a volatile storage such as static random access memory (SRAM).

The second storage unit 346 can include a second storage interface 348. The second storage interface 348 can be used for communication between other functional units in the second device 106. The second storage interface 348 can also be used for communication that is external to the second device 106.

The second storage interface 348 can receive information from the other functional units or from external sources, or can transmit information to the other functional units or to external destinations. The external sources and the external destinations refer to sources and destinations external to the second device 106.

The second storage interface 348 can include different implementations depending on which functional units or external units are being interfaced with the second storage unit 346. The second storage interface 348 can be implemented with technologies and techniques similar to the implementation of the second controller interface 344.

The second communication unit 336 can enable external communication to and from the second device 106. For example, the second communication unit 336 can permit the second device 106 to communicate with the first device 102 over the communication path 104.

The second communication unit 336 can also function as a communication hub allowing the second device 106 to function as part of the communication path 104 and not limited to be an end point or terminal unit to the communication path 104. The second communication unit 336 can include active and passive components, such as microelectronics or an antenna, for interaction with the communication path 104.

The second communication unit 336 can include a second communication interface 350. The second communication interface 350 can be used for communication between the second communication unit 336 and other functional units in the second device 106. The second communication interface 350 can receive information from the other functional units or can transmit information to the other functional units.

The second communication interface 350 can include different implementations depending on which functional units are being interfaced with the second communication unit 336. The second communication interface 350 can be implemented with technologies and techniques similar to the implementation of the second controller interface 344.

The first communication unit 316 can couple with the communication path 104 to send information to the second device 106 in the first device transmission 308. The second device 106 can receive information in the second communication unit 336 from the first device transmission 308 of the communication path 104.

The second communication unit 336 can couple with the communication path 104 to send information to the first device 102 in the second device transmission 310. The first device 102 can receive information in the first communication unit 316 from the second device transmission 310 of the communication path 104. The display system 100 can be executed by the first control unit 312, the second control unit 334, or a combination thereof.

For illustrative purposes, the second device 106 is shown with the partition having the second user interface 338, the second storage unit 346, the second control unit 334, and the second communication unit 336, although it is understood that the second device 106 can have a different partition. For example, the second software 342 can be partitioned differently such that some or all of its function can be in the second control unit 334 and the second communication unit 336. Also, the second device 106 can include other functional units not shown in FIG. 3 for clarity.

The functional units in the first device 102 can work individually and independently of the other functional units. The first device 102 can work individually and independently from the second device 106 and the communication path 104.

The functional units in the second device 106 can work individually and independently of the other functional units. The second device 106 can work individually and independently from the first device 102 and the communication path 104.

For illustrative purposes, the display system 100 is described by operation of the first device 102 and the second device 106. It is understood that the first device 102 and the second device 106 can operate any of the modules and functions of the display system 100.

Figure 4:
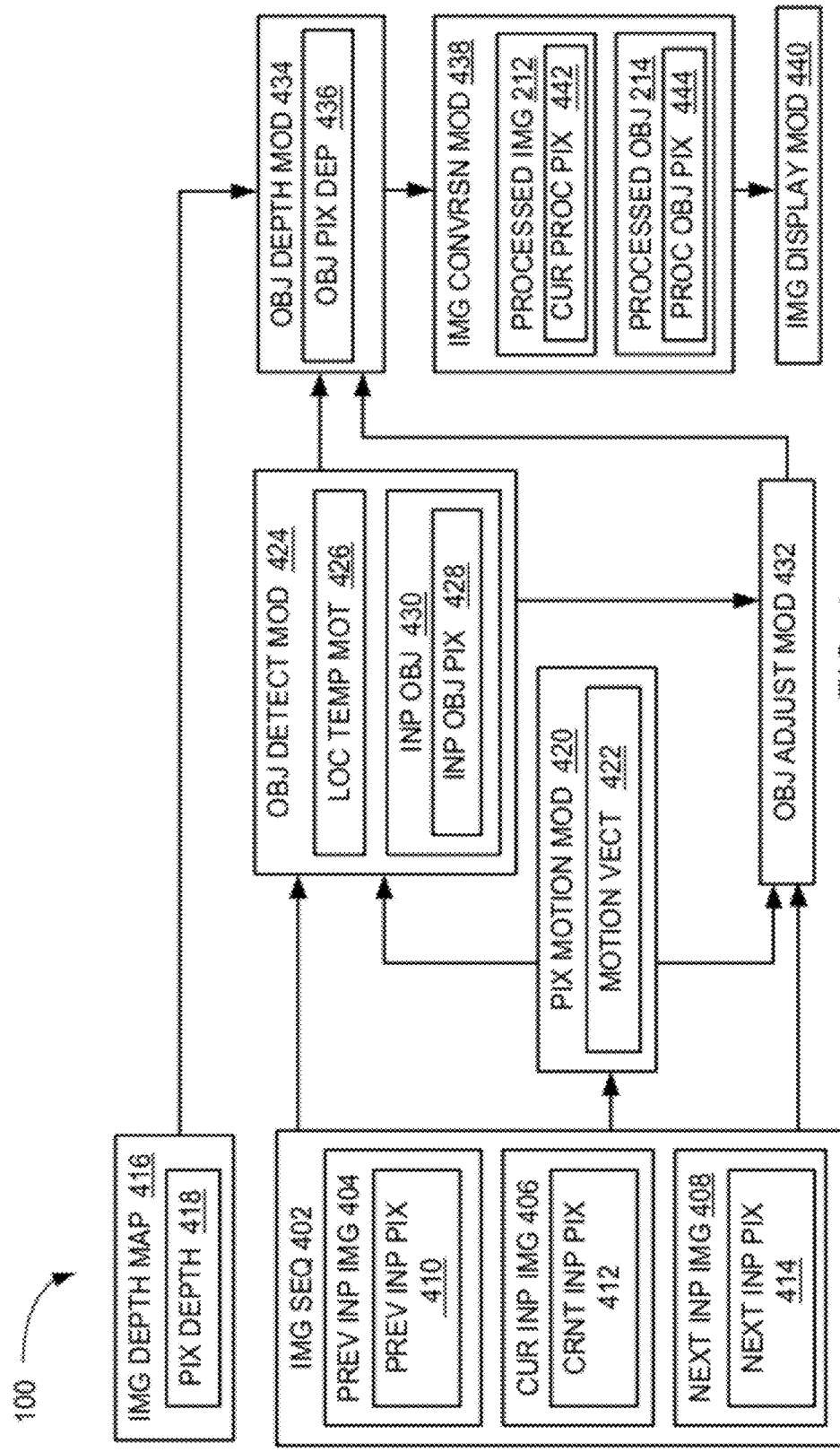
FIG. 4 is a control flow of the display system.

Referring now to FIG. 4, therein is shown a control flow of the display system 100. The display system 100 can include an image sequence 402. The image sequence 402 is defined as a series of images for displayed on a device. For example, the image sequence 402 can include a first image for display at a first time period, a second image for display at a second time period, a third image for display at a third time period, and so on. The first time period, the second time period, and the third time period are defined as different time or time slots and are not the same to one another. The image sequence 402 can be processed for display on the first device 102.

The image sequence 402 can include a previous input image 404, a current input image 406, and a next input image 408. The current input image 406 is defined as the image in the image sequence 402 that is being processed for display. The previous input image 404 is defined as the image processed for display immediately preceding the current input image 406. The next input image 408 is defined as the image to be processed for display immediately following the current input image 406.

For illustrative purpose, the display system 100 is shown having the image sequence 402 with the previous input image 404, the current input image 406, and the next input image 408, although it is understood that the image sequence 402 can include a different number of images. For example, the image sequence 402 can include one or more images preceding the previous input image 404, one or more images following the next input image 408, or a combination thereof. As a further example, the image sequence 402 can only include images preceding the previous input image 404 or only images following the next input image 408.

The previous input image 404, the current input image 406, and the next input image 408 can have previous input pixels 410, current input pixels 412, and next input pixels 414, respectively. The previous input pixels 410, the current input pixels 412, and the next input pixels 414 are defined as the individual pixels used to generate the previous input image 404, the current input image 406, and the next input image 408, respectively.

The display system 100 can include an image depth map 416. The image depth map 416 is defined as a map that represents the depth information for each of the pixels in an image. The image depth map 416 can be a map of an image pixel depth 418 for each of the current input pixels 412. The image pixel depth 418 is defined as a measure of the perceived distance or the perceived depth 211 of an image. For example, if a first one of the current input pixels 412 has the image pixel depth 418 that is greater than that of a second one of the current input pixels 412, then the first one of the current input pixels 412 can appear closer that the second one of the current input pixels 412.

The display system 100 can include a pixel motion module 420. The pixel motion module 420 is for tracking a pixel across a sequence of images and calculating temporal motion of the pixel. Temporal motion is defined as the change in position or location of a particular pixel from one image to the next in a sequence or series of images. The pixel motion module 420 can receive the image sequence 402. The pixel motion module 420 can be optional.

The pixel motion module 420 can calculate a motion vector 422. The motion vector 422 is defined as information describing the temporal motion of a pixel. The motion vector 422 can be a measure of the temporal motion of the current input pixels 412. For example, the motion vector 422 can be measured as the change along the x-axis 213 of FIG. 2 and the z-axis 217 of FIG. 2, or as a vector, which describes the magnitude and direction of the temporal motion. The calculation of the motion vector 422 can be optional.

As a further example, the pixel motion module 420 can track the current input pixels 412 in the image sequence 402 by identifying a corresponding one of the previous input pixels 410 in the previous input image 404, a corresponding one of the next input pixels 414 in the next input image 408, or a combination thereof.

The pixel motion module 420 can calculate the motion vector 422 for the current input pixels 412 through a variety of different methods. For example, the pixel motion module 420 can use block matching algorithms, phase correlation methods, recursive algorithms. As a further example, the pixel motion module 420 can verify the pixel motion through various methods, such as mean squared error (MSE), sum of absolute differences (SAD), or mean absolute differences (MAD).

The display system 100 can include an object detection module 424. The object detection module 424 is for detecting an object in an image and for detecting the object having a localized temporal motion 426. The localized temporal motion 426 is defined as motion that occurs within a limited or specified area or portion of the image. Each of these functions will be discussed in greater detail below. The object detection module 424 can receive the image sequence 402. Optionally, the object detection module 424 can receive the motion vector 422.

The object detection module 424 can identify input object pixels 428. The input object pixels 428 are defined as pixels that represent an object in an image or an object that appears in a series of images. The input object pixels 428 can represent an input object 430 in the current input image 406, the previous input image 404, the next input image 408, or a combination thereof.

The input object 430 is defined as an object that remains in the relatively fixed position in a stream or sequence of images. An object having the relatively fixed position means that the object has little or no movement along the x-axis 213 or the z-axis 217 in a stream or sequence of images. For example, the input object 430 can include a string or group of text for subtitles, a scoreboard in a sporting event, or an animated or non-animated logo, such as a logo representing a television station, or a scrolling banners or text fields, such as the scrolling text for advertisements or news updates that can appear in a relatively fixed location in the current input image 406, the previous input image 404, the next input image 408, or a combination thereof. The input object 430 can be an object that appears through multiple sequential images in a stream or sequence of images.

The display system 100 can include an object adjustment module 432. The object adjustment module 432 is for reducing or eliminating false detection of the input object pixels 428 in the current input image 406 as a whole and in localized portions of the current input image 406. Each of the functions will be discussed in greater detail below. The object adjustment module 432 can be optional.

The display system 100 can include an object depth module 434. The object depth module 434 is for calculating a depth weight and calculating depth for an object in an image with the depth weight. Each of these functions will be discussed in greater detail below.

The object depth module 434 can generate object pixel depth 436. The object pixel depth 436 is defined as a measure of the perceived distance or the perceived depth 211 of the input object pixels 428.

The display system 100 can include an image conversion module 438. The image conversion module 438 is for generating an image having the perceived depth 211. The image conversion module 438 can generate the processed image 212 from the current input image 406 by applying the image depth map 416 to the current input image 406 for display on the first device 102.

The image conversion module 438 can apply the image pixel depth 418 to the current input pixels 412 to generate current processed pixels 442. The current processed pixels 442 are defined as pixels processed to have the perceived depth 211. The processed image 212 can be generated from the current processed pixels 442.

The image conversion module 438 can apply the object pixel depth 436 to the input object pixels 428 to generate processed object pixels 444. The processed object pixels 444 are defined as pixels representing an object in an image having the perceived depth 211. The processed object 214 can be generated from the processed object pixels 444.

The display system 100 can include an image display module 440. The image display module is for displaying an image on a device. The image display module 440 can display the processed image 212 on the first device 102.

The display system 100 can be implemented on the first device 102, on the second device 106 of FIG. 1, or partitioned between the first device 102 and the second device 106. For example, the second device 106 can transmit the image sequence 402, having the current input image 406, the previous input image 404, the next input image 408, or a combination, thereof through the communication path 104 of FIG. 3 as the second device transmission 310 of FIG. 3. The first device 102 can receive the image sequence 402 with the first communication unit 316 of FIG. 3. The first communication interface 328 of FIG. 3 can transmit the image stream to the first storage unit 314 of FIG. 3, the first control unit 312 of FIG. 3, or a combination thereof.

The first software 326 of FIG. 3 or the first control unit 312 can execute the pixel motion module 420, the object detection module 424, the object adjustment module 432, the object depth module 434, the image conversion module 438, and the image display module 440.

The first control interface 322 or the first storage interface 324 can transmit the processed image 212 to the first display interface 330 of FIG. 3. The first display interface 330 can receive and display the processed image 212.

The display system 100 describes the module functions or order as an example. The modules can be partitioned differently. For example, the second software 342 can include the pixel motion module 420 or the object adjustment module 432. Each of the modules can operate individually and independently of the other modules.

Furthermore, data generated in one module can be used by another module without being directly coupled to each other. For example, the object depth module 434 can receive the image sequence 402.

Figure 5:
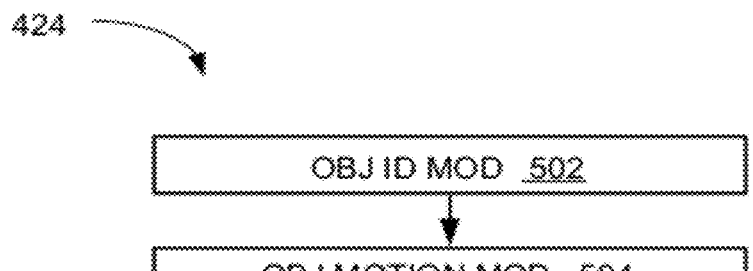
FIG. 5 is a view of the object detection module.

Referring now to FIG. 5, therein is shown a view of the object detection module 424. The object detection module 424 can identify the input object pixels 428 from the current input pixels 412 with an object identification module 502. The object identification module 502 is for identifying pixels representing an object in an image based on differences in pixel characteristics. The object identification module 502 can identify the input object pixels 428 from the current input pixels 412 based on differences in pixel characteristics.

The pixel characteristics are defined as properties or characteristics of a particular pixel. For example, the pixel characteristics can include the motion vector 422, the color of the current input pixels 412, the luminance of the current input pixels 412, or any other property or characteristics of the current input pixels 412.

The object identification module 502 can identify the input object pixels based on a combination of differences of the pixel characteristics of the current input pixels 412. For example, the object detection module 424 can identify the input object pixels 428 based on differences in the motion vector 422, the color, or luminance between adjacent ones of the current input pixels 412 or groups of the current input pixels 412, or similarly through edge detection in the current input image 406.

As a specific example, the object detection module 424 can identify one of the current input pixels 412 as the input object pixels 428 when the motion vector 422 of the current input pixels 412 is low compared to the motion vector 422 of an adjacent one of the current input pixels 412. In another specific example, the object detection module 424 can identify one of the current input pixels 412 as the input object pixels 428 when a strong or sharp edge is detected between adjacent ones of the current input pixels 412 or between adjacent segments of the current input pixels 412.

The object detection module 424 can include an object motion module 504. The object motion module 504 is for identifying the pixels having the localized temporal motion 426. For example, the object motion module 504 can check the motion vector 422 for the input object pixels 428 identified as the input object pixels 428 based on color, luminance, edge detection, or other properties. If the motion vector 422 for the input object pixels 428 is small, constant, unidirectional, confined to the same limited space across multiple images, or a combination thereof, the object motion module 504 can determine that the input object pixels 428 have the localized temporal motion 426. Examples of the input object 430 having the localized motion 426 can include objects such as scrolling text, animated logos or symbols, or scrolling advertisements.

The display system 100 can be implemented on the first device 102 of FIG. 1, on the second device 106 of FIG. 1, or partitioned between the first device 102 and the second device 106. For example, the second storage unit 346 of FIG. 3 can store the object identification module 502 and the first control unit 312 can execute the object identification module 502.

The display system 100 describes the module functions or order as an example. The modules can be partitioned differently. For example, the first control unit 312 can include the object identification module 502 and the first storage unit 314 can have the object motion module 504. Each of the modules can operate individually and independently of the other modules.

Furthermore, data generated in one module can be used by another module without being directly coupled to each other. For example, the object motion module 504 can receive the image sequence 402.

Figure 6:
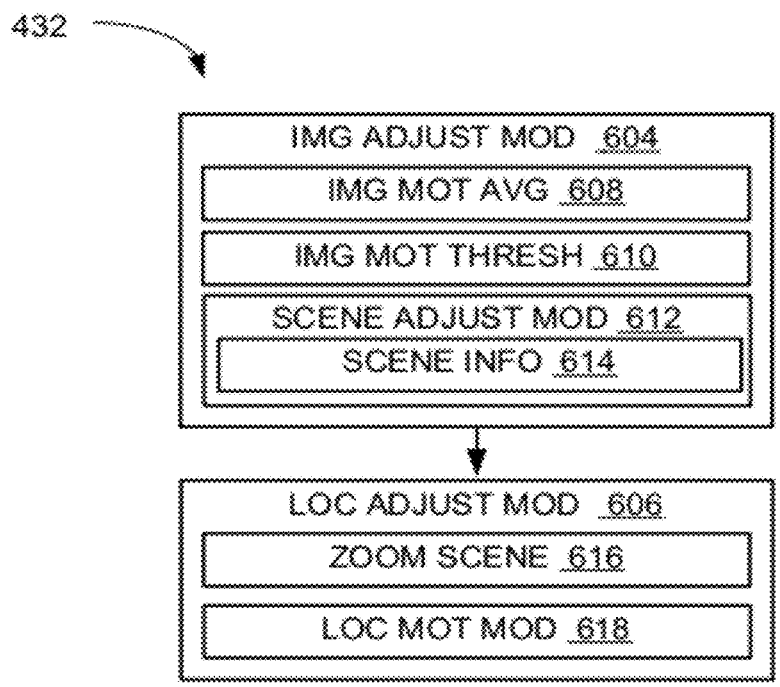
FIG. 6 is a view of the object adjustment module.

Referring now to FIG. 6, therein is shown a view of the object adjustment module 432. The object adjustment module 432 can prevent false detection of the input object pixels 428 with an image adjustment module 604 and a local adjustment module 606. False detection is defined as improper or incorrect detection or identification of pixels in an area. For example, false detection of the input object pixels 428 can occur when there is little or no movement in a scene presented by the current input image 406, such as a static scene or a still shot.

The image adjustment module 604 is for preventing false detection of pixels representing objects in the image as a whole based on overall pixel motion and information representing the scene presented by an image. For example, the image adjustment module 604 can determine if sufficient motion exists in the current input image 406 to accurately identify the input object pixels 428 in an image by comparing an image motion average 608 to an image motion threshold 610.

The image motion average 608 is defined as a measure of overall pixel motion in an image. For example, the image adjustment module 604 can calculate the image motion average 608 by averaging the magnitude of the motion vector 422 for each of the current input pixels 412 in the current input image 406. As a further example, a high value of the image motion average 608 can mean that the current input image 406 represents a scene having a high degree of motion, such as an action sequence in a movie or a sports scene. Conversely, a low value of the image motion average 608 can mean that the current input image 406 has a low degree of motion, such as in a news broadcast or interview scene.

The image motion threshold 610 is defined as a threshold to determine when an image has sufficient overall pixel motion to accurately identify pixels representing objects. For example, the image motion threshold 610 can be a predetermined value or percentage that is representative of static scenes, which have little or no motion.

The image adjustment module 604 can determine if the current input image 406 has sufficient motion to accurately identify the input object pixels 428 when the image motion average 608, is above the image motion threshold 610. For example, if the image adjustment module 604 determines that the image motion average 608 is above the image motion threshold 610, the display system 100 can use the object depth module 434 to calculate the object pixel depth 436 for the input object pixels 428. Conversely, if the image motion average 608 is below the image motion threshold 610, the display system 100 can skip calculation of the object pixel depth 436 and use the image pixel depth 418.

The image adjustment module 604 can include a scene adjustment module 612. The scene adjustment module 612 is for verifying pixels representing objects in an image with little or no pixel motion. The scene adjustment module 612 can verify the input object pixels 428 in the current input image 406 based on a scene information 614.

The scene information 614 is defined as information that describes the type of scene presented by the current input image 406. The scene information 614 can describe any type of scene presented by the current input image 406. For example, the scene information 614 can be a scene for a home shopping network, a scene for a sports broadcast, or a news broadcast.

The scene adjustment module 612 can verify the input object pixels 428 for the current input image 406 having specific ones of the scene information 614. For example, if the scene information 614 is a scene that has the image motion average 608 below the image motion threshold 610 but is a scene commonly associated with the input object 430, then the scene adjustment module 612 can verify the current input pixels 412 as the input object pixels 428. As an example, the scene information 614 that is commonly associated with the input object 430 can include scenes that commonly include subtitles, logos, or boxes containing texts or information, like home shopping scenes or news telecast scenes.

The local adjustment module 606 is for preventing false detection of the pixels representing objects in localized portions of an image having little or no pixel motion. For example, the local adjustment module 606 can prevent false detection of pixels representing objects in a zoom scene 616. The zoom scene 616 defined as a scene that focuses in or out of a portion of the image.

The local adjustment module 606 can identify the localized portions of the current input image 406 with a local motion module 618. The local motion module 618 is for identifying portions of an image with camera zoom. For example, the local adjustment module 606 can detect zoom by identifying the local region of little or no motion surrounded by regions of high motion with the motion vector 422 of the current input pixels 412 having a direction that is radially outward and away from the central portion or region having little or no pixel motion.

When the local motion module 618 detects the zoom scene 616, the local adjustment module 606 can prevent calculation of the object pixel depth 436 for the input object pixels 428 in the portion of the current input image 406 having little or no pixel motion.

The display system 100 can be implemented on the first device 102 of FIG. 1, on the second device 106 of FIG. 1, or partitioned between the first device 102 and the second device 106. For example, the second storage unit 346 of FIG. 3 can store the scene information 614 and the first control unit 312 can execute the scene adjustment module 612.

The display system 100 describes the module functions or order as an example. The modules can be partitioned differently. For example, the first control unit 312 can include the image adjustment module 604 and the first storage unit 314 can have the local adjustment module 606. Each of the modules can operate individually and independently of the other modules.

Furthermore, data generated in one module can be used by another module without being directly coupled to each other. For example, the local adjustment module 606 can receive the image sequence 402.

Figure 7:
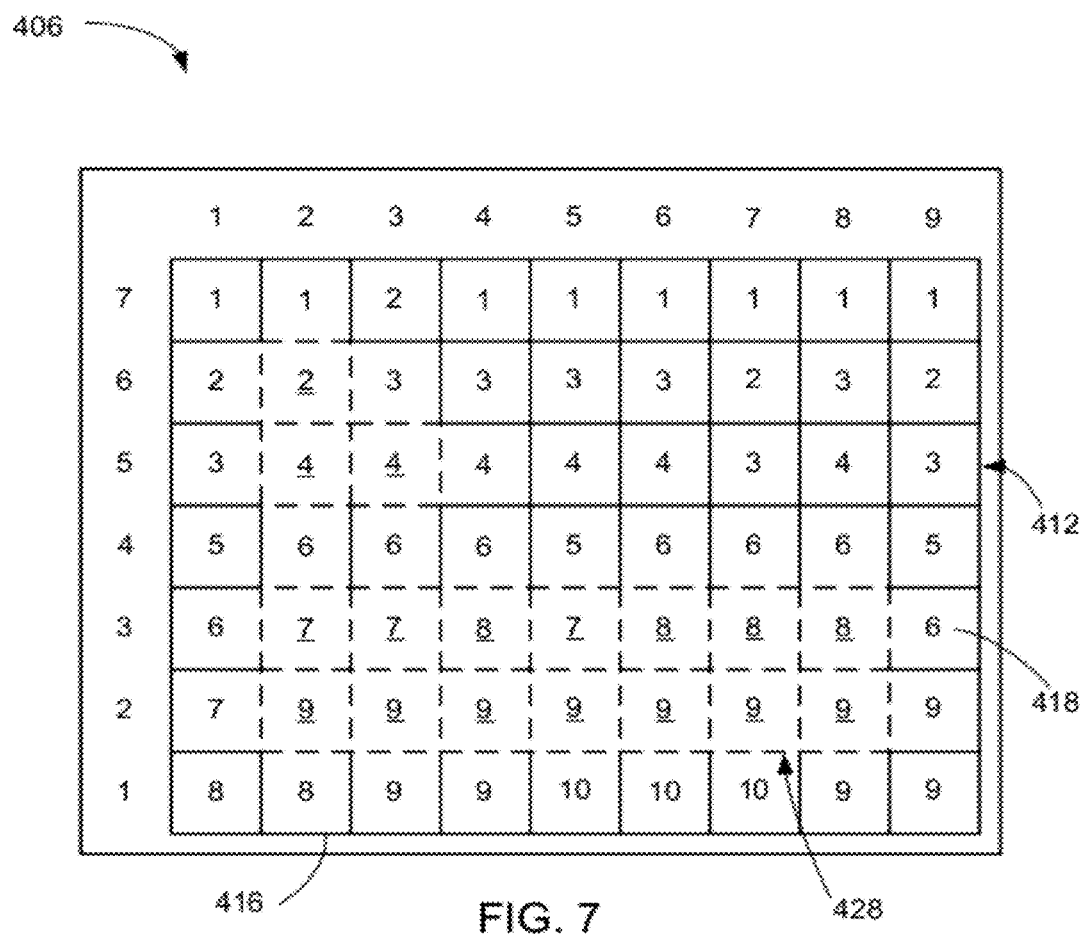
FIG. 7 is an exemplary portion of the image depth map of the current input image.

Referring now to FIG. 7, therein is shown an exemplary portion of the image depth map 416 of the current input image 406. The portion of the image depth map 416 is represented as a 7×9 block of pixels. The image depth map 416 can include the current input pixels 412, the input object pixels 428, and the image pixel depth 418. The current input pixels 412 are depicted as the solid squares. The input object pixels 428 are depicted by the dashed squares. The image pixel depth 418 is represented by numbers inside each of the current input pixels 412 and the input object pixels 428. The underlined numbers represent the image pixel depth 418 for the input object pixels 428. The numbers along the top of the image depth map 416 are column numbers and the numbers along the left side of the image depth map 416 are the row numbers.

As an example, the higher values of the image pixel depth 418 in the current input pixels 412 and the input object pixels 428 can represent a greater value of the perceived depth 211 of FIG. 2. As a specific example, the current input pixels 412 and input object pixels 428 in row 1, which have greater values of the image pixel depth 418, will appear closer than those in row 7, which have lower values of the image pixel depth 418.

Figure 8:
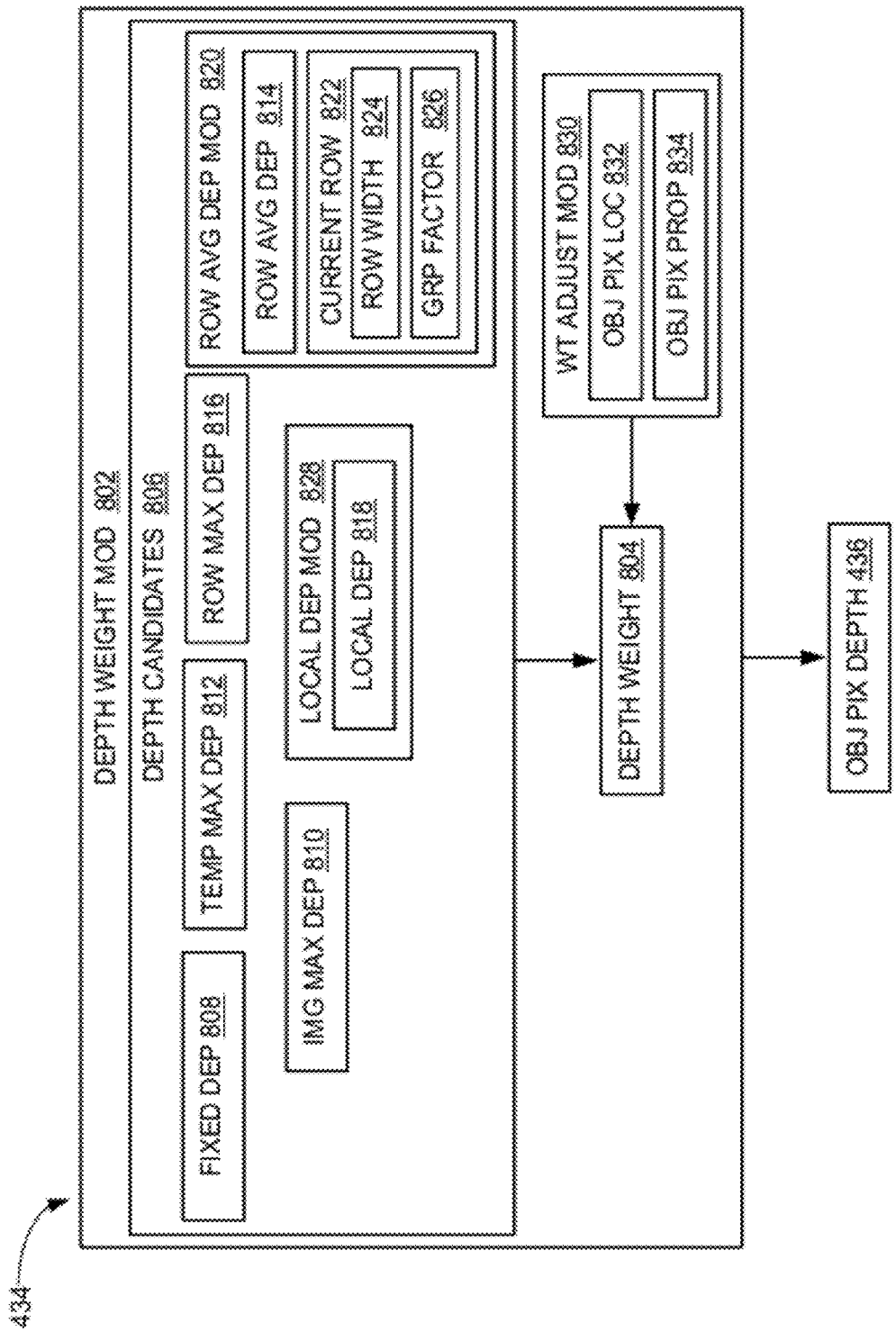
FIG. 8 is a view of the object depth module.

Referring now to FIG. 8, therein is shown a view of the object depth module 434. The object depth module 434 can include a depth weight module 802. The depth weight module 802 is for calculating a weight factor that is used to calculate the depth of a pixel representing an object in an image. The depth weight module 802 can calculate a depth weight 804.

The depth weight 804 is defined as a value based on depth candidates 806 and various pixel properties and characteristics. The depth weight 804 can be calculated based the depth candidates 806, which can include the image pixel depth 418, a fixed depth 808, an image maximum depth 810, a temporal maximum depth 812, a row average depth 814, a row maximum depth 816, and a local depth 818. The depth weight 804 can be calculated for each of the input object pixels 428 in the current input image 406.

The fixed depth 808 is defined as value of depth that does not change based on the location of the image. For example, the input object 430 having the object pixel depth 436 as the fixed depth 808 will have the same value of the perceived depth 211 regardless of location in the current input image 406 or the perceived depth 211 of the portions of the current input image 406 adjacent to the input object 430.

The fixed depth 808 can be a pre-defined constant valued for a sequence of images, can vary from one image to another in a sequence of images, or can be determined heuristically for a sequence of images through iterative or recursively methods. As a specific example, the fixed depth 808 can be based on a default setting, such as a value of 128 for an 8 bit depth value.

The image maximum depth 810 is defined as a measure of depth based on the maximum depth of a pixel in image. The image maximum depth 810 can be calculated as a percentage of the current input pixels 412 having the highest value of the image pixel depth 418 in the current input image 406. For example, the input object 430 having the object pixel depth 436 as the image maximum depth 810 will have the perceived depth 211 that is a percentage less than the portion of the current input image 406 with the greatest value of the perceived depth 211. As a specific example, the image maximum depth 810 can be 95% of the image pixel depth 418 of the current input pixels 412 having the highest value of the image pixel depth 418 in the current input image 406.

An example of the image maximum depth 810 can be illustrated by FIG. 7. In FIG. 7, the image maximum depth 810 can be 9.5, which is 95% of the highest value of the image pixel depth 418, which is 10, appearing in row 1, columns 5-7.

The temporal maximum depth 812 is defined as an average value of the maximum pixel depths across multiple sequential images. For example, the temporal maximum depth 812 can be calculated by averaging the image maximum depth 810 of the previous input image 404, the current input image 406, and the next input image 408. The temporal maximum depth 812 can be can be 95% of the average of the image maximum depth 810 from the image sequence 402.

The row average depth 814 is defined as the average depth of one or more rows of pixels in an image. The depth weight module 802 can calculate the row average depth 814 with a row average depth module 820. The row average depth module 820 can calculate the row average depth 814 for a current row 822 of the current input pixels 412. The current row 822 is defined as the row of the current input pixels 412 that are being averaged by the row average depth module 820. The current row 822 can have a row width 824, which is defined as the total number of the current input pixels 412 that span the width of the current input image 406.

The row average depth 814 can be calculated to include an average of a number of vertically adjacent rows of the current input pixels 412 that are above and below the current row 822 of the current input pixels 412. The number of rows that are included in the calculation of the row average depth 814 can be determined by a group factor 826, which is defined as the number of vertically adjacent rows included in the calculation of the row average depth 814. The group factor 826 can be a constant value or can vary based on detection of the input object pixels 428 in the rows adjacent to the current row 822.

The row average depth module 820 can calculate the row average depth 814 according to equation (1), which is shown as follows:

$$D_{RA} = \frac{\sum_{i=1}^{i=W} \sum_{j-k}^{j+k} D_{IP}(ii, jj)}{W(2K+1)}. \quad \text{equation (1)}$$

In the equation 1, $D_{RA}$ is the row average depth 814, W is the row width 824, j is the current row 822, i is the ith pixel in the current row 822, K is the group factor 826, and $D_{IP}(ii,jj)$ is the image pixel depth 418 at the current row 822 j and position i along the row width 824. As an example, the input object 430 having the object pixel depth 436 as the row average depth 814 will have the perceived depth 211 that is an average of the perceived depth 211 of the rows of the current input pixels 412 used to calculate the row average depth 814.

An example of the row average depth module 820 can be illustrated by FIG. 7. The depth weight module 802 can calculate the row average depth 814 for a single row having the input object pixels 428. For example, the second row can have the row average depth 814 of 8.7, the third row can have the row average depth 814 of 7.2, the fifth row can have the row average depth 814 of 3.6, and the sixth row can have the row average depth 814 of 2.5. Similarly, the depth weight module 802 can calculate the row average depth for adjacent rows having the input object pixels 428. For example, the second and third rows can have the row average depth 814 of 8 and the fifth and sixth rows can have the row average depth 814 of 3.1.

The row maximum depth 816 is defined as the greatest value of the image pixel depth 418 for a row of the current input pixels 412 or a group of vertically adjacent rows of the current input pixels 412 having the input object pixels 428. The depth weight module 802 can check the image pixel depth 418 for each of the current input pixels 412 and the input object pixels 428 and can determine the row maximum depth 816 as the greatest value of the image pixel depth 418 for a given row. Similarly, for a number of vertically adjacent rows each having the input object pixels 428, the depth weight module 802 can check the image pixel depth 418 for each of the current input pixels 412 and the input object pixels 428 and can determine the row maximum depth 816 as the greatest value of the image pixel depth 418.

An example of the row maximum depth 816 can be illustrated by FIG. 7. The depth weight module 802 can calculate the row maximum depth 816 for a single row having the input object pixels 428. For example, the second row can have the row maximum depth 816 of 9, the third row can have the row maximum depth 816 of 8, the fifth row can have the row maximum depth 816 of 4, and the sixth row can have the row maximum depth 816 of 3. Similarly, the depth weight module 802 can calculate the row maximum depth for adjacent rows having the input object pixels 428. For example, the second and third rows can have the row maximum depth 816 of 9 and the fifth and sixth rows can have the row maximum depth 816 of 4.

The local depth 818 is defined as the maximum pixel depth among a group of pixel rows. The depth weight module 802 can calculate the local depth 818 with a local depth module 828. The function of the local depth module 828 will be discussed in greater detail below.

The depth weight module 802 can calculate the depth weight 804 as the weighted average of the depth candidates 806, which includes the fixed depth 808, the image maximum depth 810, the temporal maximum depth 812, the row average depth 814, and the local depth 818. Preferably, for the depth weight 804, 50% to 75% can be based on the image pixel depth 418, 0% to 7% can be based on the row average depth 814, 9% to 25% can be based on the image maximum depth 810 or alternatively the temporal maximum depth 812, and 9% to 25% can be based on the local depth 818.

The object depth module 434 can optionally include a weight adjustment module 830. The weight adjustment module 830 is for adjusting the weights of factors used to calculate pixel depth based on an object pixel location 832, an object pixel property 834, or a combination thereof.

The object pixel location 832 is defined as the location of the input object pixels 428 in the current input image 406. For example, the object pixel location 832 can be specific coordinates within the current input image 406 or general areas of the image, such as the bottom portion, the center, or corners of the current input image 406. As a further example, the object pixel location 832 can be associated with areas common to the input object 430, such as at the bottom center or in the upper left corner of the current input image 406.

The object pixel property 834 is defined as a property that is commonly associated with the input object 430, such as specific colors or luminance levels. For example, the object pixel property 834 commonly associated with the input object 430 that represent subtitle texts are colors such as white or light yellow or high luminance levels relative to the adjacent portions of the current input image 406. As a further example, the object pixel property 834 can be a feature of such as a boarder around scoreboard.

The weight adjustment module 830 can adjust the depth weight 804 to increase or decrease the perceived depth 211 of the input object pixels 428 based on the object pixel location 832 and the object pixel property 834. For example, if the weight adjustment module 830 detects that the object pixel location 832 and the object pixel property 834 as commonly associated with the input object 430, then the weight adjustment module 830 can adjust the depth weight 804 to further distinguish the input object 430 from the current input image 406 by increasing the perceived depth 211. As a specific example, the weight adjustment module 830 can distinguish the input object 430 from the current input image 406 by adjusting the depth weight 804 to be 50% the image pixel depth 418, 0% the row average depth 814, 25% the image maximum depth 810, and 25% the local depth 818.

In another example, if the weight adjustment module 830 detects that the object pixel location 832 and the object pixel property 834 as not commonly associated with the input object 430, then the weight adjustment module 830 can adjust the depth weight 804 to reduce the perceived depth 211 or blend the input object 430 with the current input image 406. As a specific example, the object pixel location 832 that is not commonly associated with the input object 430 can be the center of the current input image 406. In another specific example, the weight adjustment module 830 can blend the input object 430 with the current input image 406 by adjusting the depth weight 804 to be 75% the image pixel depth 418, 7% the row average depth 814, 9% the image maximum depth 810, and 9% the local depth 818.

As a further example, the weight adjustment module 830 can adjust the depth weight 804 for the input object pixels 428 having the localized temporal motion 426. As a specific example, the depth weight 804 can be adjusted to minimize the weight of the image pixel depth 418 and maximize the weight of the image maximum depth 810. In another specific example, depth weight 804 can be 0% the image pixel depth 418, 75% the image maximum depth 810, and 25% the local depth 818.

The object depth module 434 can calculate the object pixel depth 436 by multiplying the image pixel depth 418 corresponding to the input object pixels 428 and the depth weight 804 for the input object pixels 428.

It has been discovered that the present invention provides the display system 100 having reduced depth disparity between the processed object 214 and processed image 212. The depth weight 804, calculated from the weighted average of the depth candidates 806, can be used to calculate the object pixel depth 436 and applied to the input object 430 to generate the processed object 214 having reduced depth disparity with the processed image 212.

The physical transformation from displaying the processed image 212 results in movement in the physical world, such as people moving in response to the processed image 212 when playing games or viewing a 3d image. The first display interface 330 can display the processed image 212 by manipulating the pixels on the first device 102, thus resulting in movement in the physical world.

The display system 100 can be implemented on the first device 102 of FIG. 1, on the second device 106 of FIG. 1, or partitioned between the first device 102 and the second device 106. For example, the second storage unit 346 of FIG. 3 can store object pixel location 832 and the first control unit 312 can execute the weight adjustment module 830.

The display system 100 describes the module functions or order as an example. The modules can be partitioned differently. For example, the first control unit 312 can include the depth weight module 802, the local depth module 828, and the row average depth module 820 and the first storage unit 314 can have the weight adjustment module 830. Each of the modules can operate individually and independently of the other modules.

Furthermore, data generated in one module can be used by another module without being directly coupled to each other. For example, the weight adjustment module 830 can receive the image pixel depth 418.

Figure 9:
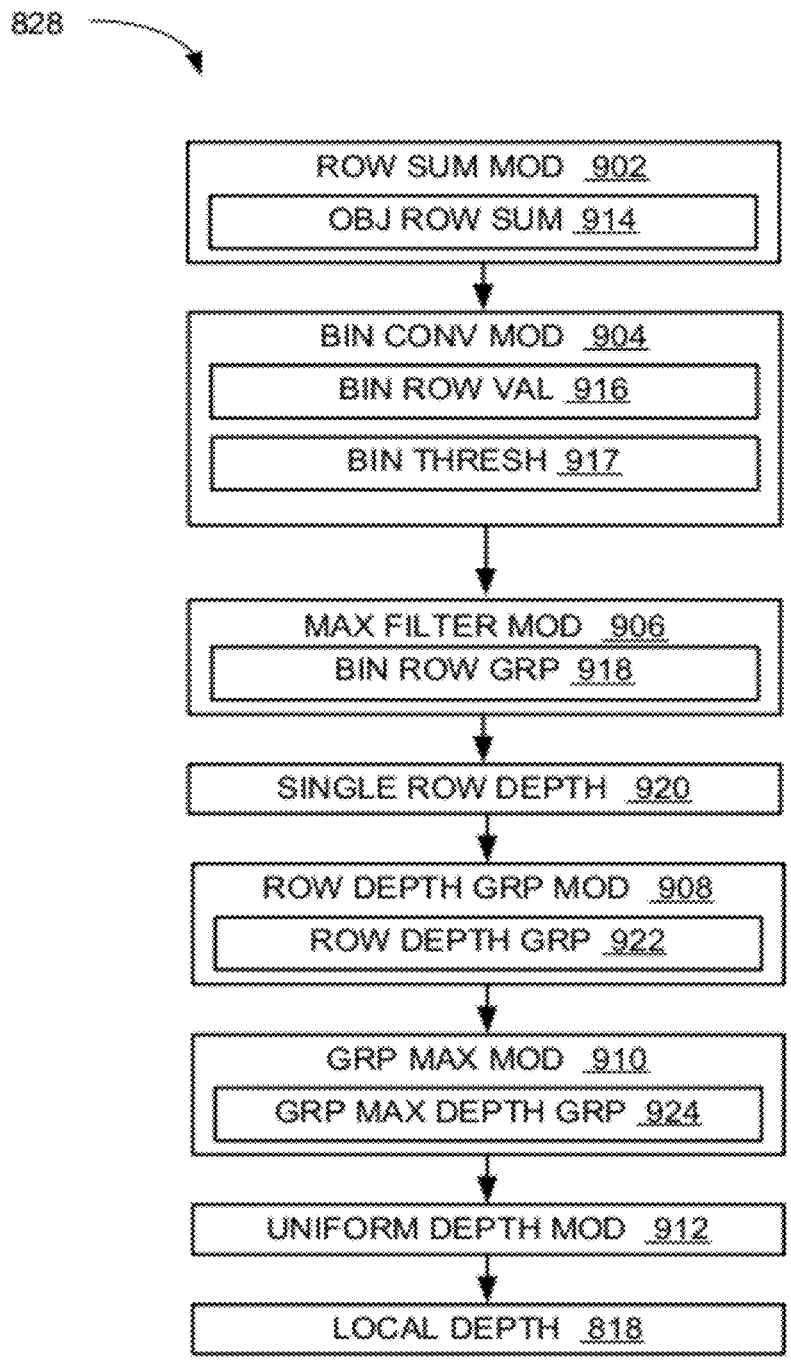
FIG. 9 is a view of the local depth module.

Referring now to FIG. 9, therein is a view of the local depth module 828. The local depth module 828 can calculate the local depth 818 with a row sum module 902, a binary conversion module 904, a maximum filter module 906, a row depth group module 908, a group maximum module 910, and a uniform depth module 912.

The row sum module 902 is for summing up the number of pixels representing an object for each row of pixels in an image. The row sum module 902 can calculate an object row sum 914. The object row sum 914 is defined as the total number of the input object pixels 428 in a given row of the current input pixels 412. For example, if a row of the input object pixels 428 has five of the input object pixels 428, the row sum module 902 can calculate the object row sum 914 as five. The row sum module 902 can calculate the object row sum 914 for each row of the current input pixels 412 in the current input image 406.

The binary conversion module 904 is for converting a value that represents a pixel count for a given row of pixels into a binary value. The binary conversion module 904 can convert the object row sum 914 into a binary row value 916 for each row of the current input pixels 412 in the current input image 406 based on a binary threshold. The binary row value 916 is defined as a binary measure of whether a row contains pixels that represents an object.

The binary threshold 917 is defined as threshold to determine if enough pixels in row of pixels represent an object. The binary threshold 917 can be determined based on a percentage of the total number of input object pixels 428 in a row of the current input pixels 412. For example, the binary threshold 917 can be determined as 4% of the total number of input object pixels 428 in a row of the current input pixels 412. As a specific example, if a row of the current input pixels 412 has a value of 480 for the object row sum 914, then the binary threshold 917 can be calculated as 19, which is approximately 4% of 480.

The binary conversion module 904 can calculate the binary row value 916 by comparing the object row sum 914 to the binary threshold 917. For example, when the object row sum 914 for a row of the current input pixels 412 is greater than the binary threshold 917, the binary conversion module 904 can set the binary row value 916 for that particular row as one. Conversely, when the object row sum 914 for a row of the current input pixels 412 is below the binary threshold 917, the binary conversion module 904 can set the binary row value 916 for that particular row as zero.

The maximum filter module 906 is for filtering out rows of pixels having a binary value of zero. The maximum filter module 906 can generate a binary row group 918 based on the binary row value 916. The binary row group 918 is defined as a group of vertically adjacent rows of the current input pixels 412 with the binary row value 916 of one.

The maximum filter module 906 can generate the binary row group 918 by filtering out the rows of the current input pixels 412 with the binary row value 916 of zero that are between closely spaced rows of the current input pixels with the binary row value 916 of one.

As an example, the maximum filter module 906 can determine if two conditions are met. First, the series of vertically adjacent rows of the current input pixels 412 with the binary row value 916 of zero is between a series of vertically adjacent rows of the current input pixels 412 with the binary row value 916 of one. Second, the number of vertically adjacent rows having the binary row value 916 of one should be greater than the number of vertically adjacent rows having the binary row value 916 of zero.

The local depth module 828 can utilize the row average depth module 820 to calculate a single row depth 920 for each row of the current input pixels 412 in the current input image 406. The single row depth 920 is defined as the average value of the image pixel depth 418 of all the current input pixels 412 in a row of the current input image 406. The local depth module 828 can calculate the single row depth 920 according to equation (1) above, where the group factor, K, is zero.

The local depth module 828 can identify a row depth group 922 based on the single row depth 920 and the binary row value 916 with the row depth group module 908. The row depth group 922 is defined as a series of continuous adjacent rows of pixels. Continuous adjacent rows of pixels are rows that have no intervening gaps. For example, the first, second, and third row of pixels in an image would be continuous adjacent rows. Conversely, the first, third, and fifth rows would not be continuous adjacent rows because the second and fourth rows form gaps in the series of rows.

The row depth group module 908 can identify the row depth group 922 by multiplying the single row depth 920 by the binary row value 916 for each row of the current input pixels 412. After multiplication, the row depth group module 908 can group the continuous adjacent rows of the current input pixels 412 that have a non-zero value. For example, the row depth group module 908 can identify the row depth group 922 when two or more rows of the current input pixels 412 have a non-zero value after multiplying the single row depth 920 by the binary row value 916 for each row.

The local depth module 828 can determine a group maximum depth 924 of the row depth group 922 with the group maximum module 910. The group maximum module 910 can determine the group maximum depth 924 for the row depth group 922 by equating the group maximum depth 924 to the greatest value of the single row depth 920 in the row depth group 922. The local depth 818 can be the group maximum depth 924 of vertically grouped rows of the current input pixels 412.

The local depth module 828 can determine the local depth 818 with the uniform depth module 912. The uniform depth module 912 is for assigning a uniform depth value to all rows of pixels in a group. The uniform depth module 912 can assign the local depth 818 for all the current input pixels 412 in each row of the row depth group 922 as the group maximum depth 924. As an example, the local depth 818 can be the group maximum depth 924 of vertically grouped rows of the current input pixels 412. The uniform depth module 912 can assign the local depth 818 for each of the row depth group 922 in the current input image 406.

The display system 100 can be implemented on the first device 102 of FIG. 1, on the second device 106 of FIG. 1, or partitioned between the first device 102 and the second device 106. For example, the second control unit 334 of FIG. 3 can execute the row sum module 902 and the first control unit 312 can execute the binary conversion module 904.

The display system 100 describes the module functions or order as an example. The modules can be partitioned differently. For example, the first control unit 312 can include the row sum module 902, the binary conversion module 904, the maximum filter module 906 and the first storage unit 314 can have the row depth group module 908, the group maximum module 910 and the uniform depth module 912. Each of the modules can operate individually and independently of the other modules.

Furthermore, data generated in one module can be used by another module without being directly coupled to each other. For example, the group maximum module 910 can receive the image pixel depth 418.

Figure 10:
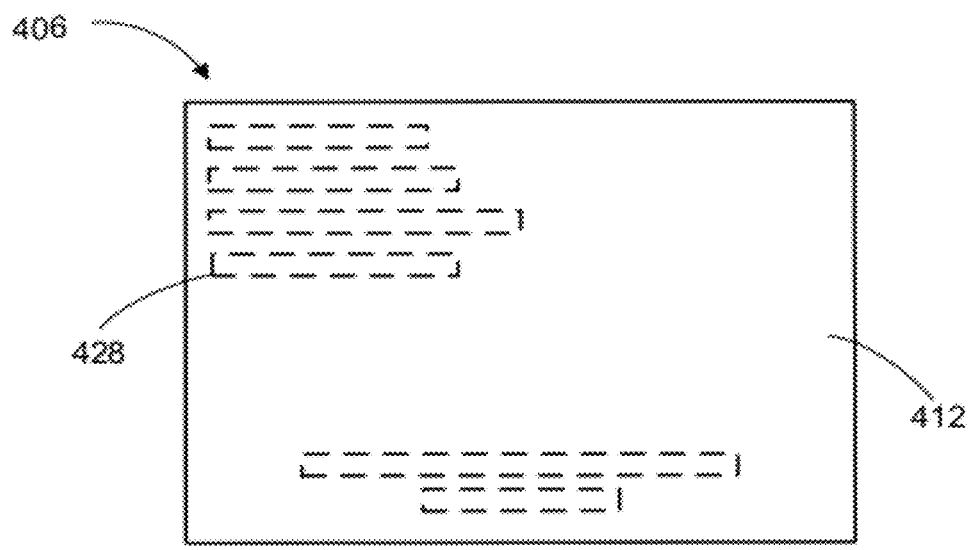
FIG. 10 is an example of the current input image.

Referring now to FIG. 10, therein is shown an example of the current input image 406. The current input image 406 includes rows having the input object pixels 428, as depicted by the areas within the dotted lines. The white area represents the current input pixels 412. As an example, the input object pixels 428 can represent subtitles or other text in the current input image 406.

Figure 11:
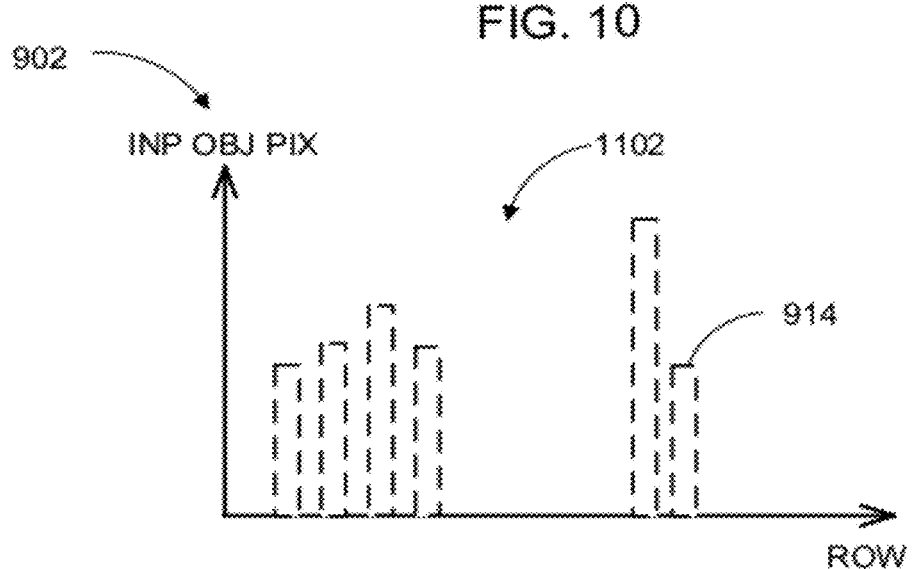
FIG. 11 is an example of the row sum module.

Referring now to FIG. 11, therein is shown an example of the row sum module 902. The row sum module 902 can calculate the object row sum 914, which is the total number of the input object pixels 428 of FIG. 10 in each row of the current input pixels 412 of FIG. 10 as depicted on a chart 1102 by the areas within the dotted lines. The x-axis of the chart 1102 corresponds to the rows in the current input image 406 of FIG. 10. The y-axis of the chart 1102 is a reference for the number of the input object pixels 428.

Figure 12:
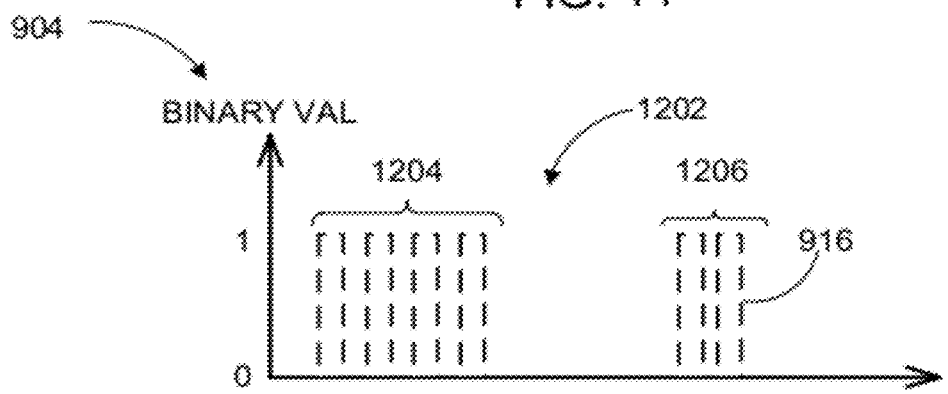
FIG. 12 is an example of the binary conversion module.

Referring now to FIG. 12, therein is shown an example of the binary conversion module 904. The binary conversion module 904 can convert the object row sum 914 of FIG. 11 to the binary row value 916 for each row of the current input pixels 412 of FIG. 10, as depicted on a chart 1202 by the areas within the dotted lines. The x-axis of the chart 1202 corresponds to the rows in the current input image 406 of FIG. 10. The y-axis of the chart 1202 is a reference for the binary row value 916.

As an example, the chart 1202 depicts a first group 1204 of four rows having the binary row value 916 of one and three rows having the binary row value 916 of zero along the left portion of the chart 1202. The rows having the binary row value 916 of zero in the first group 1204 correspond to closely spaced rows of the current input pixels 412 with the binary row value 916 of one. Similarly, as a further example, the chart 1202 depicts a second group 1206 with two rows having the binary row value 916 of one and one row having the binary row value 916 of zero along the right portion of the chart 1202.

Figure 13:
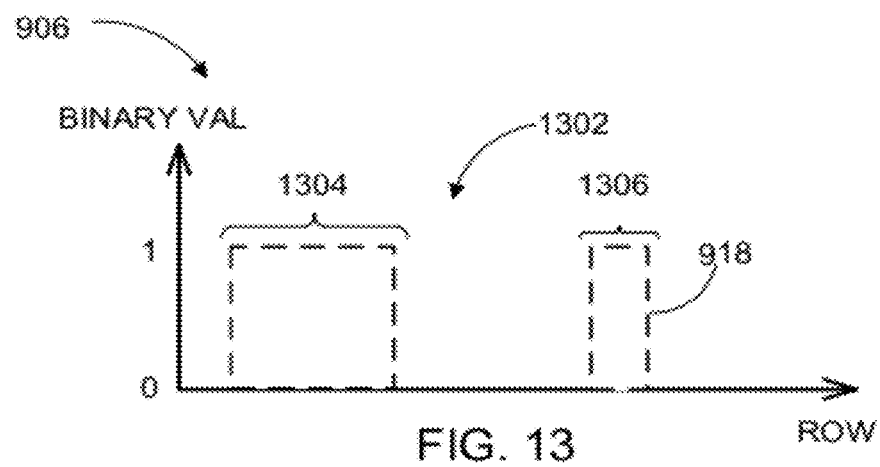
FIG. 13 is an example of the maximum filter module.

Referring now to FIG. 13, therein is shown an example of the maximum filter module 906. The maximum filter module 906 can generate the binary row group 918, as depicted on a chart 1302, by the areas within the dotted lines. The maximum filter module 960 can filter out the rows of the current input pixels 412 with the binary row value 916 of zero that are between closely spaced rows of the current input pixels with the binary row value 916 of one to generate the binary row group 918, as shown in FIG. 12. The x-axis of the chart 1302 corresponds to the rows in the current input image 406 of FIG. 10. The y-axis of the chart 1302 is a reference for the binary row value 916.

As an example, the chart 1302 depicts a first group 1304 of the binary row group 918 along the left portion of the chart 1302. Similarly, as a further example, the chart 1302 depicts a second group 1306 of the binary row group 918 along the right portion of the chart 1302.

Figure 14:
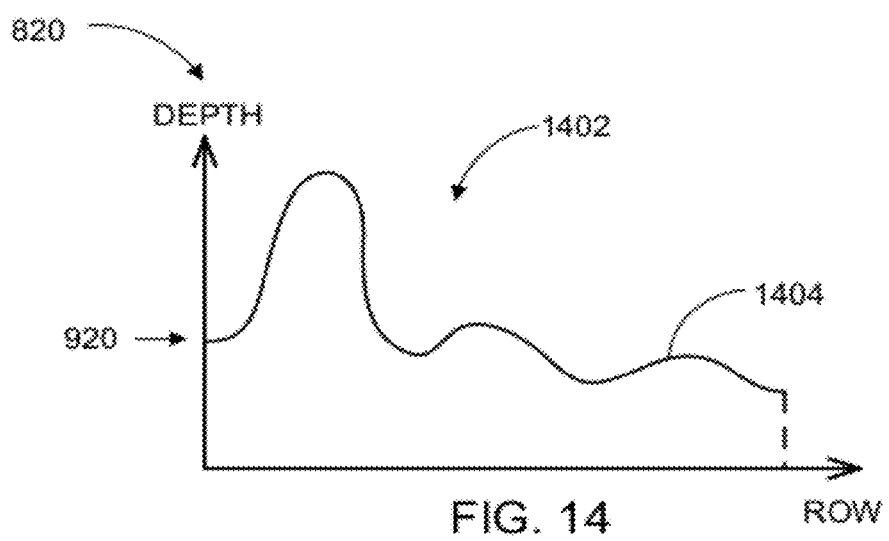
FIG. 14 is an example of the row average depth module.

Referring now to FIG. 14, therein is shown an example of the row average depth module 820. The row average depth module 820 can calculate the single row depth 920 for each row of the current input pixels 412 of FIG. 10 in the current input image 406 of FIG. 10, as depicted by a chart 1402. A curve 1404 on the chart 1402 represents the single row depth 920 for each row of the current input pixels 412 in the current input image 406. The x-axis of the chart 1402 corresponds to the rows in the current input image 406. The y-axis of the chart 1402 is a reference for the single row depth 920.

Figure 15:
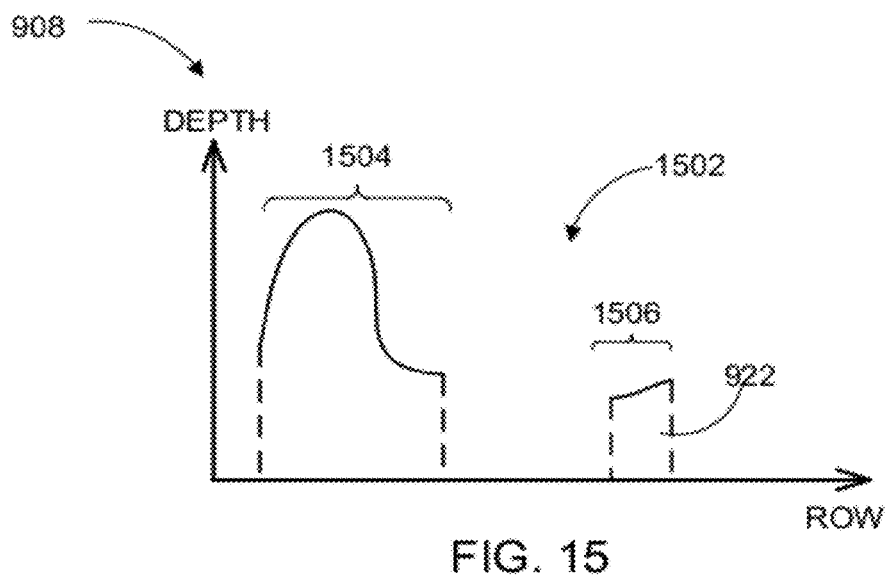
FIG. 15 is an example of the row depth group module.

Referring now to FIG. 15, therein is shown an example of the row depth group module 908. The row depth group module 908 can generate the row depth group 922 by multiplying the single row depth 920 of FIG. 14 by the binary row value 916 of FIG. 13 for each row of the current input pixels 412 of FIG. 10, as depicted by a chart 1502. The x-axis of the chart 1502 corresponds to the rows in the current input image 406. The y-axis of the chart 1502 is a reference for the single row depth 920.

After multiplication, the row depth group module 908 can group the continuous adjacent rows of the current input pixels 412 that have a non-zero value to generate the row depth group 922. As an example, the chart 1502 depicts a first group 1504 of the row depth group 922 along the left portion of the chart 1502. Similarly, as a further example, the chart 1502 depicts a second group 1506 of the row depth group 922 along the right portion of the chart 1502.

Figure 16:
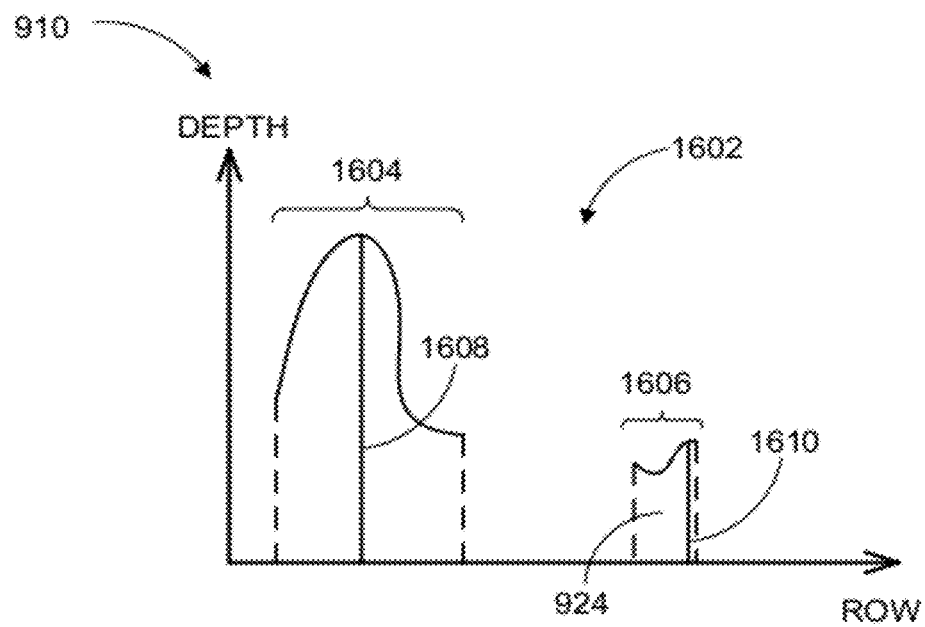
FIG. 16 is an example of the group maximum module.

Referring now to FIG. 16, therein is shown an example of the group maximum module 910. The group maximum module 910 can determine the group maximum depth 924 of the row depth group 922 by equating the group maximum depth 924 to the greatest value of the single row depth 920 of FIG. 14 in the row depth group 922, as depicted by a chart 1602. The x-axis of the chart 1602 corresponds to the rows in the current input image 406 of FIG. 10. The y-axis of the chart 1602 is a reference for the single row depth 920.

As an example, the chart 1602 depicts a first group 1604 of the row depth group 922 with a first value 1608 of the group maximum depth 924 along the left portion of the chart 1602. Similarly, as a further example, the chart 1602 depicts a second group 1606 of the row depth group 922 with a second value 1610 of the group maximum depth 924 along the right portion of the chart 1602.

Figure 17:
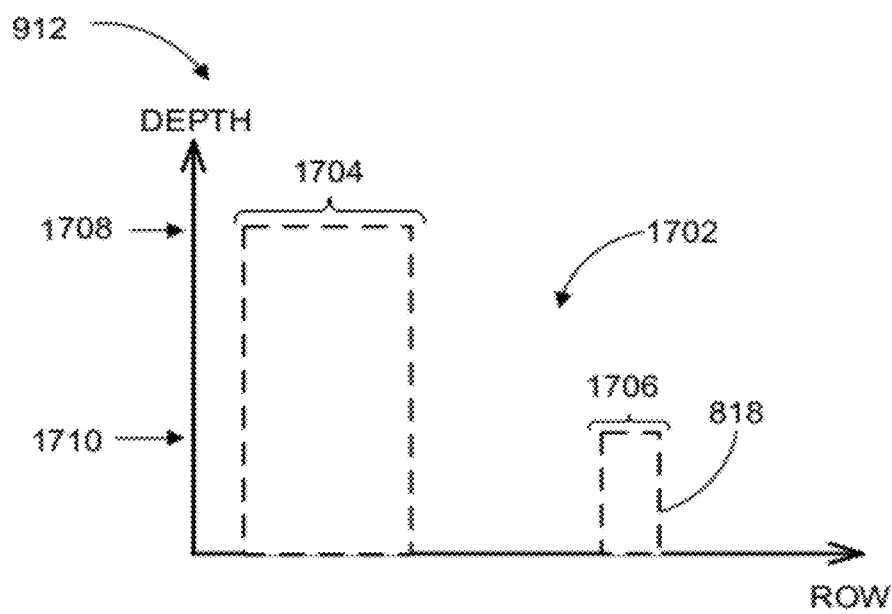
FIG. 17 is an example of the uniform depth module.

Referring now to FIG. 17, therein is shown an example of the uniform depth module 912. The uniform depth module 912 can assign the local depth 818 for all the current input pixels 412 of FIG. 10 in each row of the row depth group 922 of FIG. 16 as the group maximum depth 924, as depicted by a chart 1702 by the areas within the dotted lines. The x-axis of the chart 1702 corresponds to the rows in the current input image 406 of FIG. 10. The y-axis of the chart 1702 is a reference for the local depth 818.

As an example, the chart 1702 depicts a first group 1704 of rows of the current input pixels 412 having a first value 1708 of the local depth 818 along the left portion of the chart 1702. Similarly, as a further example, the chart 1702 depicts a second group 1706 of rows of the current input pixels 412 having a second value 1710 of the local depth 818 along the right portion of the chart 1702.

Figure 18:
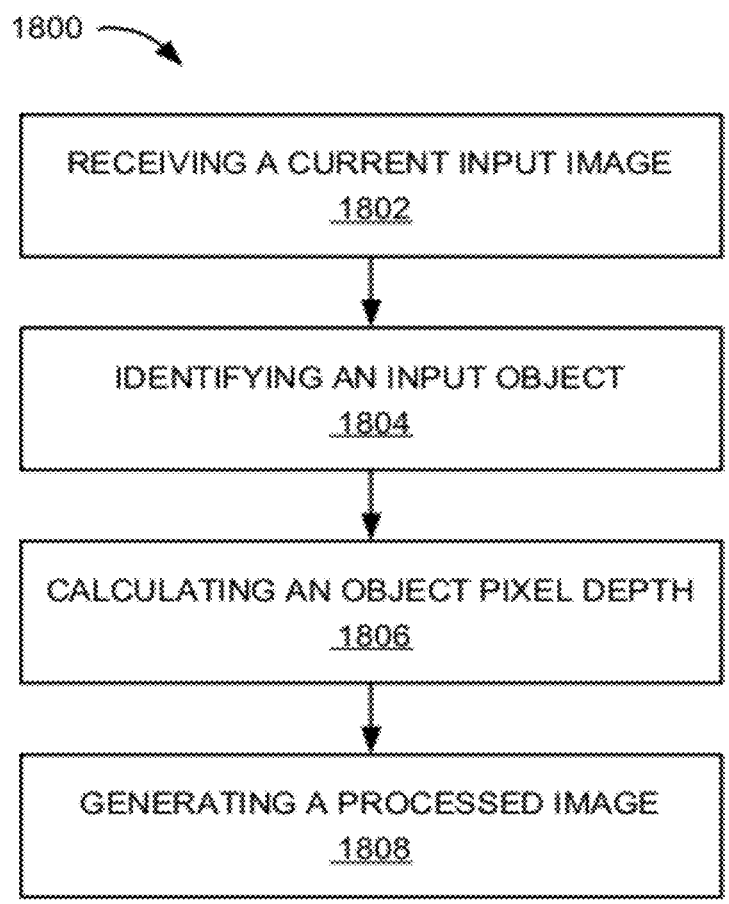
FIG. 18 is a flow chart of a method of operation of a display system in a further embodiment of the present invention.

Referring now to FIG. 18, therein is shown a flow chart of a method 1800 of operation of a display system in a further embodiment of the present invention. The method 1800 includes: receiving a current input image with current input pixels in a block 1802; identifying an input object, having input object pixels, based on differences in characteristics of the current input pixels in a block 1804; calculating an object pixel depth for the input object pixels from an image depth map of the current input image based on a weighted average of depth candidates in a block 1806; and generating a processed image, having a perceived depth, from the current input image with the image depth map and the object pixel depth for displaying on a device in a block 1808.

The resulting method, process, apparatus, device, product, and/or system is straightforward, cost-effective, uncomplicated, highly versatile, accurate, sensitive, and effective, and can be implemented by adapting known components for ready, efficient, and economical manufacturing, application, and utilization. Another important aspect of the present invention is that it valuably supports and services the historical trend of reducing costs, simplifying systems, and increasing performance.

These and other valuable aspects of the present invention consequently further the state of the technology to at least the next level.

While the invention has been described in conjunction with a specific best mode, it is to be understood that many alternatives, modifications, and variations will be apparent to those skilled in the art in light of the aforegoing description. Accordingly, it is intended to embrace all such alternatives, modifications, and variations that fall within the scope of the included claims. All matters hithertofore set forth herein or shown in the accompanying drawings are to be interpreted in an illustrative and non-limiting sense.

What is claimed is:

1. A method of operation of a display system comprising:
receiving a current input image with current input pixels;
identifying an input object, having input object pixels, based on differences in characteristics of the current input pixels;
calculating an object pixel depth for the input object pixels from an image depth map of the current input image based on a weighted average of depth candidates; and
generating a processed image, having a perceived depth, from the current input image with the image depth map and the object pixel depth for displaying on a device.

2. The method as claimed in claim 1 wherein identifying the input object includes identifying the input object having localized temporal motion.

3. The method as claimed in claim 1 wherein calculating an object pixel depth includes adjusting the weighted average of the depth candidates based on an object pixel location of the input object pixels.

4. The method as claimed in claim 1 wherein calculating an object pixel depth includes adjusting the weighted average of the depth candidates based on object pixel property of the input object pixels.

5. The method as claimed in claim 1 further comprising verifying the input object pixels with a scene information.

6. A method of operation of a display system comprising:
receiving a current input image having current input pixels;
identifying an input object, having input object pixels, based on differences in characteristics of the current input pixels;
calculating an object pixel depth for the input object pixels from an image depth map of the current input image based on a weighted average of an image maximum depth, a row average depth, a local depth, and an image pixel depth; and
generating a processed image from the current input image with the image depth map and the object pixel depth for displaying on a device.

7. The method as claimed in claim 6 wherein calculating the object pixel depth includes calculating the object pixel depth based on a temporal maximum depth.

8. The method as claimed in claim 6 wherein calculating the object pixel depth based on the row average depth includes calculating the row average depth with an average of a current row and vertically adjacent rows of the current input pixels.

9. The method as claimed in claim 6 wherein calculating the object pixel depth based on the local depth includes assigning the local depth a group maximum depth of vertically grouped rows of the current input pixels.

10. The method as claimed in claim 6 wherein generating the processed image includes applying the object pixel depth to the input object pixels to generate a processed object having a perceived depth.

11. A display system comprising:
a communication unit for receiving a current input image having current input pixels;
an object detection module, coupled to the communication unit, for identifying an input object, having input object pixels, based on differences in characteristics of the current input pixels;
an object depth module; coupled to the object detection module, for calculating an object pixel depth for the input object pixels from an image depth map of the current input image based on a weighted average of depth candidates; and
an image conversion module; coupled to the object depth module, for generating a processed image, having a perceived depth; from the current input image with the image depth map and the object pixel depth; for displaying on a device.

12. The system as claimed in claim 11 further comprising an object motion module; coupled to the object detection module, for identifying the input object having localized temporal motion.

13. The system as claimed in claim 11 further comprising a weight adjustment module, coupled to the object depth module, for adjusting the weighted average of the depth candidates based on an object pixel location of the input object pixels.

14. The system as claimed in claim 11 further comprising a weight adjustment module, coupled to the object depth module, for adjusting the weighted average of the depth candidates based on object pixel property of the input object pixels.

15. The system as claimed in claim 11 further comprising a scene adjustment module, coupled to the object detection module, for verifying the input object pixels with a scene information.

16. The system as claimed in claim 11 wherein the object depth module is for calculating the object pixel depth based on the weighted average of an image maximum depth, a row average depth, a local depth, and an image pixel depth.

17. The system as claimed in claim 16 wherein the object depth module is for calculating the object pixel depth based on a temporal maximum depth.

18. The system as claimed in claim 16 wherein the object depth module is for calculating the row average depth with an average of a current row and vertically adjacent rows of the current input pixels.

19. The system as claimed in claim 16 wherein the object depth module is for assigning the local depth a group maximum depth of vertically grouped rows of the current input pixels.

20. The system as claimed in claim 16 wherein the image conversion module is for applying the object pixel depth to the input object pixels to generate a processed object having the perceived depth.

* * * * *